(12) United States Patent
George et al.

(10) Patent No.: US 11,288,864 B2
(45) Date of Patent: Mar. 29, 2022

(54) METHODS AND SYSTEMS FOR PRODUCING CONTENT IN MULTIPLE REALITY ENVIRONMENTS

(71) Applicant: SIMILE INC., Brooklyn, NY (US)

(72) Inventors: James George, Brooklyn, NY (US);
Alexander Porter, Brooklyn, NY (US);
Timothy Scaffidi, Brooklyn, NY (US);
Neil Purvey, Brooklyn, NY (US);
Patricia Shiu, Ridgewood, NY (US)

(73) Assignee: SIMILE INC., Brooklyn, NY (US)

( * ) Notice: Subject to any disclaimer, the term of this patent is extended or adjusted under 35 U.S.C. 154(b) by 10 days.

(21) Appl. No.: 16/979,000

(22) PCT Filed: Mar. 8, 2019

(86) PCT No.: PCT/US2019/021281
§ 371 (c)(1),
(2) Date: Sep. 8, 2020

(87) PCT Pub. No.: WO2019/173672
PCT Pub. Date: Sep. 12, 2019

(65) Prior Publication Data
US 2021/0375044 A1    Dec. 2, 2021

Related U.S. Application Data

(60) Provisional application No. 62/640,285, filed on Mar. 8, 2018.

(51) Int. Cl.
*G06T 17/20* (2006.01)
*G06T 15/08* (2011.01)
*G06T 15/04* (2011.01)

(52) U.S. Cl.
CPC .............. *G06T 17/20* (2013.01); *G06T 15/04* (2013.01); *G06T 15/08* (2013.01)

(58) Field of Classification Search
None
See application file for complete search history.

(56) References Cited

U.S. PATENT DOCUMENTS

| | | | |
|---|---|---|---|
| 9,171,403 B2* | 10/2015 | Shapira | G06K 9/00671 |
| 10,565,719 B2* | 2/2020 | Bleyer | G06T 7/70 |
| 2010/0302247 A1 | 12/2010 | Perez et al. | |
| 2013/0342526 A1 | 12/2013 | Ng et al. | |
| 2016/0171759 A1* | 6/2016 | Kao | G06T 17/20 345/423 |
| 2016/0307367 A1 | 10/2016 | Chuang et al. | |
| 2016/0364907 A1 | 12/2016 | Schoenberg | |

(Continued)

OTHER PUBLICATIONS

Du, S. et al., "GPU-based Adaptive Surface Reconstruction for Real-time SPH Fluids," WSCG 2014 Conference on Computer Graphics, Visualization and Computer Vision, Jun. 2-5, 2014, pp. 141-150.

(Continued)

*Primary Examiner* — Nurun N Flora
(74) *Attorney, Agent, or Firm* — RMCK Law Group, PLC

(57) ABSTRACT

This disclosure contains methods and systems that allow filmmakers to port filmmaking and editing skills to produce content to be used in other environments, such as video game environments, and augmented reality, virtual reality, mixed reality, and non-linear storytelling environments.

21 Claims, 19 Drawing Sheets

(56) References Cited

U.S. PATENT DOCUMENTS

| | | | | |
|---|---|---|---|---|
| 2017/0116756 A1* | 4/2017 | Imber | ................ | G06T 7/90 |
| 2018/0211373 A1* | 7/2018 | Stoppa | ................ | G06K 9/4628 |
| 2018/0240244 A1* | 8/2018 | Uyyala | ................ | G06T 17/10 |
| 2019/0066387 A1* | 2/2019 | Grossmann | ................ | G06F 3/017 |

OTHER PUBLICATIONS

PCT International Search Report and Written Opinion dated Jun. 25, 2019 for International Application No. PCT/US2019/021281, 14 pages.
Kim, Y. et al., "Structure Selective Depth Superresolution for RGB-D Cameras," IEEE Transactions on Image Processing, vol. 25, No. 11, Nov. 2016, pp. 5227-5238.
Melnykowycz, M., "DepthKit with Microsoft Kinect + Sony A7s," idezo, Apr. 6, 2015, The Wayback Machine, https://web.archive.org/web/20171017215642/https://idezo.ch/depthkit-with-microsoft-kinect-sony-a7s, 5 pages.
Partial Supplementary European Search Report dated Jul. 14, 2021 for EP Application No. 19763612.9, 9 pages.

\* cited by examiner

METHODS AND SYSTEMS FOR PRODUCING CONTENT IN MULTIPLE REALITY ENVIRONMENTS

PRIORITY CLAIM

This application is a 371 U.S. National Stage of International Application No. PCT/US2019/021281, filed Mar. 8, 2019, which claims priority from U.S. Provisional Patent Application Ser. No. 62/640,285, filed Mar. 8, 2018. The contents of both of the above applications are herein incorporated by reference in their entirety.

FIELD

The present disclosure generally relates to a volumetric video production platform and, more particularly, to a volumetric video production platform with a suite of tools and supporting technology components that allow filmmakers to work within a familiar video editing environment and film production pipeline to produce outputs that seamlessly flow into video gaming, AR, VR, mixed reality, and other environments that use 3D geometric objects.

BACKGROUND

The filmmaking industry and the video gaming industry have historically used distinct sets of tools for development of content; however, content itself is increasingly overlapping and merging, as films use computer-generated 3D graphics objects and games use video elements captured by filmmaking cameras. The emerging augmented reality (AR) and virtual reality (VR) sectors also use mixed content types, with camera-based video streams being augmented by generated 3D objects, such as in animations that appear to be in 3D. While many filmmakers are very sophisticated users of video editing software suites, they often lack expertise in video gaming engines, motion capture systems, graphics engines, computer programming, operating systems and other software-based content creation and production environments that are used in the video gaming industry or the emerging AR and VR industries. Applicant has, therefore, identified a need for methods and systems that allow filmmakers to port filmmaking and editing skills to produce content that can be readily used in other environments, such as video game, augmented reality, virtual reality, mixed reality, and/or non-linear storytelling environments.

The emerging category of "volumetric" video content, sometimes referred to as "holographic" content, typically uses depth information in addition to color information about a scene, so that a volumetric content object (such as a person or other subject captured on video) can be rotated within a computer-generated scene and/or seen from different points of view, reflecting the 3D geometry of the object and the scene. Such volumetric content objects can be inserted into gaming engines and other content development environments and handled like other 3D objects, such as animated objects that are generated from color and geometry information encoded by developers. Today such objects are typically captured using complex, multi-camera set-ups on soundstages or in other controlled filmmaking environments and require considerable expertise in the specific technologies required for video and depth information capture. Applicant has identified a need for simplified systems for volumetric video content production.

Volumetric content objects can provide striking, compelling content in a 3D film, video game, AR environment, VR environment, or the like; however, a major barrier to adoption of volumetric content production is the absence of lack of easy-to-use production tools. Current first-generation tools tend to be too complicated for the everyday filmmaker to use. The tools are non-intuitive and require a learning curve most filmmakers choose not to endure. As a result, Applicant has identified a need for volumetric video production tools that are intuitive to filmmakers familiar with video editing tools and that integrate within the production pipeline used for filmmaking with little disruption, while providing outputs that seamlessly flow into video gaming, AR, VR and other environments that use 3D geometric objects.

Depth information can be obtained by a variety of mechanisms, ranging from multi-camera systems that use stereoscopic principles to derive depth information, infrared systems, structured light systems, systems that use moving cameras, systems that use LIDAR, SONAR, or other reflective technologies, and others. However, handling depth information from various sources in parallel with, or merged with, video information about a scene, is typically complex and computationally demanding. Applicant, therefore, has identified a need for systems that provide more effective and more efficient processing of depth and video streams, including for volumetric video content production.

SUMMARY

A volumetric video production platform is provided herein with a suite of tools and supporting technology components that allow filmmakers to work within a familiar video editing environment and film production pipeline to produce outputs that seamlessly flow into video gaming, AR, VR, mixed reality, and other environments that use 3D geometric objects.

In embodiments, the platform uses cameras augmented by hardware accessories and editing tools that filmmakers can turn video segments into geometric 3D objects and that can be used by game engines and other platforms that handle 3D objects. The platform thus opens new creative outlets for filmmakers, such as producing AR/VR experiences and non-linear storytelling, without requiring them to learn complicated new tools and/or techniques. Importantly, volumetric video content can be captured and delivered to various display environments without requiring expensive and complex studio production environments, enabling significant reductions in production cost that make volumetric video content a viable option a much broader range of content providers.

In embodiments, the platform enables an end-to-end data processing pipeline architecture, including a super-resolution stage (with various enabling systems, algorithms, modules, and the like) and a deferred surface reconstruction stage (also with systems, algorithms, modules, and the like). In embodiments, the data processing pipeline architecture includes a data flow framework, a graphics rendering abstraction framework and a media input/output (I/O) framework to optimize concurrency. This enables highly parallelized acquisition and processing of video and depth pixel information streams by the system. In embodiments, the super-resolution pipeline stage combines low-resolution depth information with a high-resolution video signal. This combination produces a high quality synthetic video image that can be handled by volume-aware content systems. In embodiments, the platform applies a sensor fusion algorithm that: (i) re-projects depth information into a color image using a local RGB+D calibration; (ii) recursively super-resolves the depth image to match the resolution of the color image using a pyramidal filter and (iii) uses inter-frame optical flow from the color stream to suppress high frequency surface noise from the super-resolved depth image.

In embodiments, a texture packing module applies algorithms to efficiently compress video input depth and color streams as planar image data. A deferred surface reconstruction engine may generate a surface stream based on the planar image data. Dynamic surface density modulation handles depth and color information for a volumetric object, where the density of a surface of an object is computed at run time. As a result, it can be modulated dynamically. Thus, planar image data can be stored, compressed, or streamed using traditional video techniques and systems. In embodiments, the platform thus defers surface construction and texture blending to a runtime environment, thereby facilitating lower bandwidth, higher speed processing and transmission until the point in a content production process where features actually need to be displayed (and unnecessary features can be omitted from the reconstruction, eliminating unnecessary computational burden and accelerating processing speed). In embodiments, the deferred surface reconstruction algorithm also includes a view dependent blending technique that refines the final output of deferred surface reconstruction in real time based on the view that will be displayed to a user.

In embodiments, the platform may include an editing environment that includes various video editing tools, where the editing tools expose depth information that can be manipulated in order to edit one or more volumetric video content objects to prepare it for delivery to a display environment. In embodiments, in some respects the volumetric video content editing user interface replicates familiar workflows for filmmakers, resembling other interfaces for ingesting and editing clips, building projects, and the like. In embodiments, however, the interface enables filmmakers to conveniently produce non-linear narratives, such as for virtual reality experiences. The user interface allows an editor to provide inputs that allow a user to define behavior of a 3D volumetric object conditionally in response to inputs (such as inputs in or from an end environment in which the object will be displayed), so that the objects are conveniently prepared for use within 3D environments, including for such non-linear narratives. In embodiments, the user interface also exposes 3D geometry during editing, so that users can conveniently adjust various parameters of the volumetric video content object (including color and depth parameters) during the editing process.

In embodiments, the platform may include one or more system interfaces for delivering volumetric video content to a content display environment. In embodiments, the platform produces output data structures/objects adapted for insertion in augmented reality and virtual reality environments, such that volumetric content objects originally captured in video are displayed within those environments, with characteristics that are modulated based on the situation, such as based on the viewing direction/point of view of a user within the AR or VR environment. In embodiments, a real-time streaming system of the platform streams a 3D volumetric content object data structure that corresponds to a moving image, such as of a live actor captured on video. For the end user viewing content produced by the platform, video content captured by a filmmaker is seamlessly merged into 3D environments like video game, virtual reality and augmented reality environments.

In embodiments, the platform may also include one or more hardware kits that enable set-up and capture of video and depth information by filmmakers, such as hardware kits including a combination of a video camera and a hardware element for capturing depth information about a scene.

In embodiments, a volumetric video production platform includes a camera system having video inputs each associated with a depth information input that produces geometry video streams with each video input and associated depth information input and an interface configured to deliver volumetric video content that is developed from the geometry video streams to a content display environment.

In embodiments, the interface is configured to produce output data structures for insertion in one of an augmented reality environment and a virtual reality environment.

In embodiments, the output data structures include characteristics that are modulated based on a situation within one of the augmented reality environment and the virtual reality environment.

In embodiments, the output data structures include a moving image of a live actor.

In embodiments, the volumetric video production platform includes a data flow framework, a graphics rendering abstraction framework and a media input/output (I/O) framework to optimize concurrency and parallelized acquisition and processing of video and depth pixel information streams by the platform.

In embodiments, the volumetric video production platform includes a sensor fusion engine that re-projects depth information into a color image using a local RGB+D calibration, that recursively super-resolves a depth image to match resolution of a color image using a pyramidal filter, and that uses inter-frame optical flow from a color stream to suppress high frequency surface noise from a super-resolved depth image.

In embodiments, the volumetric video production platform includes a deferred surface reconstruction engine that is configured to defer surface construction and texture blending to a runtime environment to facilitate relatively lower bandwidth and higher speed processing, and to permit transmission until a point in a content production process where features actually need to be displayed and unnecessary features are omitted from a reconstruction.

According to some embodiments of the present disclosure, a method for producing a synthetic video image is disclosed. The method includes receiving one or more video and depth inputs from one or more respective camera systems capturing a scene one or more respective perspectives, wherein each video and depth input is captured by a respective camera system and includes a respective video stream of the scene captured from a respective perspective and a respective depth stream of the scene captured from the respective perspective. The method further includes, for each respective video and depth input, generating a depth and color stream corresponding to the respective perspective of the video and depth input based on the video stream and the depth stream. Each respective depth and color stream includes i) a color image stream including a sequence of color images derived from the video stream of the video and depth input and ii) a refined depth image stream corresponding to the color image stream that includes a sequence of dense refined depth images that are refined by reprojecting depth images from the depth stream into respective color images of the video stream. Each dense refined depth image includes a grid of depth pixels that each indicate a respective depth value and respective color values derived from a corresponding color image. The method further includes generating a geometry video stream corresponding to the scene based on one or more depth and color streams respectively derived from the one or more color and depth input, wherein the geometry video stream includes a sequence of geometry frames, each geometry frame having embedded therein, a respective color image and a respective dense refined depth image from each of the one or more depth and color streams. The method also includes selecting a surface reconstruction process to process the geometry video stream from a plurality of surface reconstruction processes based on a number of perspectives from which the scene is captured and whether a specific hardware capability is available to process the geometry video stream. The method further includes generating a surface stream based on the geometry video stream in accordance with the selected surface reconstruction process, wherein the surface stream includes a geometry stream that defines a geometry of an object captured in the scene, and a texture stream that is time aligned with the geometry stream that defines a texture of a surface of the object. The method further includes outputting the surface stream to a buffer and/or a renderer.

In some embodiments, the plurality of surface reconstruction processes include two or more of: a tessellation process, a vertex and surface reconstruction process, a single pass ISO surface extraction, and a histopyramid surface extraction.

In some embodiments, the tessellation process is the selected surface reconstruction process when the scene is captured from a single perspective and a general process graphics processor unit (GPGPU) is available process the surface stream. In embodiments, generating the surface stream in accordance with the tessellation process includes: generating a pyramid of images based on a dense refined depth image of the depth stream; traversing the pyramid to assign values to each tile of the pyramid based on a total amount of depth disparity contained within each respective tile underneath the tile to obtain a tessellated geometry; and texturing the tessellated geometry to obtain the texture of the tessellated geometry. In embodiments, the pyramid is generated using Quadtree Pyramid Classification. In some embodiments, traversing the pyramid is performed using Quadtree Pyramid Traversal. In some embodiments, texturing the tessellated geometry includes performing edge refinement and projective texturing on the tessellated geometry.

In some embodiments, the vertex and surface reconstruction process is the selected surface reconstruction process when the scene is captured from a single perspective and a GPGPU is not available to process the surface stream. In some of these embodiments, generating the surface stream in accordance with the vertex and surface reconstruction process includes: generating a tessellated grid based on a dense refined depth image of the depth image stream, where each vertex in the tessellated grid represents a respective depth pixel; and rendering a texture corresponding to an object in the refined depth image based on the tessellated grid by perspective unprojecting each vertex in the tessellated grid into a space that is contained within the refined depth image along a frustum of a depth camera that captured the depth input. In some embodiments, the vertex and surface reconstruction process is mesh lattice unprojection.

In some embodiments, the single pass ISO surface extraction is the selected surface reconstruction process when the scene is captured from multiple perspectives and a general process graphics processor unit (GPGPU) is available process the surface stream. In some of these embodiments, generating the surface stream in accordance with the single pass ISO surface extraction process includes, for each geometry frame of the geometry stream: generating a voxel signed distance field based on each refined depth image embedded in the geometry frame, wherein the voxel signed distance field is a three-dimensional grid of voxels and each voxel indicates a signed distance from the voxel to an implicit surface defined in the geometry frame; performing an ISO-surface extraction on the voxel signed distance field to extract a tessellated mesh describing a geometry of the object; and determining a view-dependent texture based on the tessellated mesh and a viewing position parameter that indicates a point of view relative to the scene from which the object will be observed.

In some embodiments, the voxel signed distance field includes: generating a voxel distance field based on each refined depth image corresponding to the frame, wherein the voxel distance field is a three-dimensional grid of voxels and each voxel indicates an average distance from the voxel to the implicit surface; signing at least a subset of voxels in the voxel distance field based on a respective classification of each voxel in the subset of voxels by: projecting a point representing the voxel into the geometry frame based on a global extrinsic calibration and a depth camera lens intrinsic calibration corresponding to the dense refined depth image; determining whether the point is behind a surface of the object depicted in the scene or in front of the surface, when the voxel is behind the surface, assigning a first sign to the average distance in the voxel; and when the voxel is in front of the surface, assigning a second sign that is opposite to the first sign to the average distance indicated in the voxel. In embodiments, determining a view-dependent texture includes: receiving the viewing position parameter from the renderer; projecting each fragment of the tessellated mesh into a color texture of the object derived from the color image streams corresponding to the tessellated mesh; and calculating a weighted average of each fragment based on the viewing position parameter, the perspective of the corresponding camera system, and a normal vector of the tessellated mesh. In embodiments, ISO-surface extraction of the tessellated mesh is performed using Marching Cubes via indirect drawing.

In some embodiments, the histopyramid ISO-surface extraction process is the selected surface reconstruction process when the scene is captured from multiple perspectives and GPGPU capabilities are not available to process the surface stream. In embodiments, generating the surface stream in accordance with the histopyramid ISO-surface extraction process includes, for each geometry frame in the geometry video stream: generating a voxel signed distance field based on each refined depth image embedded in the geometry frame, wherein the voxel signed distance field is a three-dimensional grid of voxels and each voxel indicates a signed distance from the voxel to an implicit surface defined in the geometry frame; determining a number (N) of triangles to be included in a geometric mesh that describes a surface of the object based on a histopyramid classification of the voxel signed distance field, direct rendering the N triangles to obtain the geometric mesh; and determining a view-dependent texture based on the geometric mesh and a viewing position parameter that indicates a point of view relative to the scene from which the object will be observed.

In some embodiments, generating the voxel signed distance field includes: generating a voxel distance field based on each refined depth image corresponding to the frame, wherein the voxel distance field is a three-dimensional grid of voxels and each voxel indicates an average distance from the voxel to the implicit surface; signing at least a subset of voxels in the voxel distance field based on a respective classification of each voxel in the subset of voxels by:

projecting a point representing the voxel into the geometry frame based on a global extrinsic calibration and a depth camera lens intrinsic calibration corresponding to the dense refined depth image; determining whether the point is behind a surface of the object depicted in the scene or in front of the surface; when the voxel is behind the surface, assigning a first sign to the average distance in the voxel; and when the voxel is in front of the surface, assigning a second sign that is opposite to the first sign to the average distance indicated in the voxel.

In some embodiments, determining a view-dependent texture includes: receiving the viewing position parameter from the renderer; projecting the fragment into a color texture of the object derived from the color image stream corresponding to the geometric mesh; and calculating a weighted average of each fragment based on the viewing position parameter, the perspective of the corresponding camera system, and a normal vector of the geometric mesh.

In some embodiments, generating a depth and color stream corresponding to the respective perspective of the video and depth input includes: receiving user defined parameters, including a refinement mask, a minimum depth value, a maximum depth value, and a color image crop parameter; cropping each color image in the video stream based on the color image crop parameter to obtain the color image stream; and for each depth image in the depth stream: determining a segmented depth image by segmenting the depth image based on the minimum depth value and maximum depth value; determining a rectified depth image by reprojecting the segmented depth image into a corresponding cropped color image based on an intrinsic lens calibration of a video camera of the camera system, an intrinsic lens calibration of a depth camera of the camera system, and an extrinsic calibration between the video camera and depth camera; and determining a dense depth image by filtering the rectified depth image based on a detected edge of the object and the refinement mask. In some of these embodiments, determining the segmented depth image includes applying an automatic depth mask to each depth image in the depth stream, wherein the automatic depth mask is received in the user defined parameters. In some embodiments, the refinement mask is defined in a segmentation stream output by the video and depth input.

In some embodiments, the renderer generates a volumetric video content object based on the surface stream for inclusion in a three-dimensional rendering.

In some embodiments, each camera system includes i) a video camera that captures and outputs the respective video stream of the scene taken from the respective perspective of the camera system, and ii) at least one depth sensor that captures and outputs the respective depth stream of the scene taken from the respective perspective.

In some embodiments, the color images in the color image stream of each respective depth and color stream are cropped images that are cropped during the refinement process.

In some embodiments, outputting the surface stream includes writing the surface stream to one or more command buffers of the renderer.

In some embodiments, the selected surface reconstruction process is executed in a runtime environment of the renderer.

According to some embodiments of the present disclosure, a method for producing a synthetic video image is disclosed. The method includes receiving a plurality of video and depth inputs from a plurality of respective camera systems capturing a scene a respective plurality of different perspectives, wherein each video and depth input is captured by a respective camera system and includes a respective video stream of the scene captured from a respective perspective and a respective depth stream of the scene captured from the respective perspective. The method further includes for each respective video and depth input, generating a depth and color stream corresponding to the respective perspective of the video and depth input based on the video stream and the depth stream. Each respective depth and color stream includes i) a color image stream including a sequence of color images derived from the video stream of the video and depth input and ii) a refined depth image stream corresponding to the color image stream that includes a sequence of dense refined depth images that are refined by reprojecting depth images from the depth stream into respective color images of the video stream. Each dense refined depth image includes a grid of depth pixels that each indicate a respective depth value and respective color values derived from a corresponding color image. The method also includes generating a geometry video stream corresponding to the scene based on a plurality of depth and color streams respectively derived from the one or more color and depth input, wherein the geometry video stream includes a sequence of geometry frames, each geometry frame having embedded therein, a respective color image and a respective dense refined depth image from each of the plurality of depth and color streams. The method further includes generating a surface stream based on the geometry video stream in accordance with a surface reconstruction process, wherein the surface stream includes a geometry stream that defines a geometry of an object captured in the scene, and a texture stream that is time aligned with the geometry stream that defines a texture of a surface of the object. The method also includes outputting the surface stream to a buffer and/or a renderer.

In some embodiments, generating the surface stream includes, for each geometry frame of the geometry stream, generating a voxel signed distance field based on each refined depth image embedded in the geometry frame, wherein the voxel signed distance field is a three-dimensional grid of voxels and each voxel indicates a signed distance from the voxel to an implicit surface defined in the geometry frame. In some embodiments, generating the surface stream further includes performing an ISO surface extraction on each voxel signed distance field to extract a tessellated mesh describing a geometry of the object for each geometry frame of the geometry stream. In some embodiments, the ISO surface extraction is a single pass ISO surface extraction. In some embodiments, the ISO surface extraction is performed when there is a general process graphics processing unit (GPGPU) available to process the geometry image stream. In some embodiments, the ISO-surface extraction of the tessellated mesh is performed using Marching Cubes via indirect drawing. In embodiments, generating the surface stream further includes determining a view-dependent texture based on each respective tessellated mesh and a viewing position parameter that indicates a point of view relative to the scene from which the object will be observed for each geometry frame of the geometry stream. In some embodiments, determining a view-dependent texture includes: receiving the viewing position parameter from the renderer; projecting each fragment of the tessellated mesh into a color texture of the object derived from the color image streams corresponding to the tessellated mesh; and calculating a weighted average of each fragment based on the viewing position parameter, the perspective of the corresponding camera system, and a normal vector of the tessellated mesh.

In some embodiments, generating the voxel signed distance field includes: generating a voxel distance field based on each refined depth image corresponding to the frame, wherein the voxel distance field is a three-dimensional grid of voxels and each voxel indicates an average distance from the voxel to the implicit surface; signing at least a subset of voxels in the voxel distance field based on a respective classification of each voxel in the subset of voxels by: projecting a point representing the voxel into the geometry frame based on a global extrinsic calibration and a depth camera lens intrinsic calibration corresponding to the dense refined depth image; determining whether the point is behind a surface of the object depicted in the scene or in front of the surface; when the voxel is behind the surface, assigning a first sign to the average distance in the voxel; and when the voxel is in front of the surface, assigning a second sign that is opposite to the first sign to the average distance indicated in the voxel.

In embodiments, generating the surface stream further includes, for each geometry frame in the geometry video stream: determining a number (N) of triangles to be included in a geometric mesh that describes a surface of the object based on a histopyramid classification of the voxel signed distance field; and direct rendering the N triangles to obtain the geometric mesh. In some embodiments, generating the surface stream further includes: determining a view-dependent texture based on the geometric mesh and a viewing position parameter that indicates a point of view relative to the scene from which the object will be observed for each geometry frame of the geometry stream. In embodiments, determining a view-dependent texture includes: receiving the viewing position parameter from the renderer; projecting the fragment into a color texture of the object derived from the color image stream corresponding to the geometric mesh; and calculating a weighted average of each fragment based on the viewing position parameter, the perspective of the corresponding camera system, and a normal vector of the geometric mesh.

In some embodiments, generating a depth and color stream corresponding to the respective perspective of the video and depth input includes: receiving user defined parameters, including a refinement mask, a minimum depth value, a maximum depth value, and a color image crop parameter; cropping each color image in the video stream based on the color image crop parameter to obtain the color image stream; and for each depth image in the depth stream: determining a segmented depth image by segmenting the depth image based on the minimum depth value and maximum depth value; determining a rectified depth image by reprojecting the segmented depth image into a corresponding cropped color image based on an intrinsic lens calibration of a video camera of the camera system, an intrinsic lens calibration of a depth camera of the camera system, and an extrinsic calibration between the video camera and depth camera; and determining a dense depth image by filtering the rectified depth image based on a detected edge of the object and the refinement mask. In some of these embodiments, determining the segmented depth image includes applying an automatic depth mask to each depth image in the depth stream, wherein the automatic depth mask is received in the user defined parameters. In some embodiments, the refinement mask is defined in a segmentation stream output by the video and depth input.

In embodiments, the renderer generates a volumetric video content object based on the surface stream for inclusion in a three-dimensional rendering.

In some embodiments, each camera system includes i) a video camera that captures and outputs the respective video stream of the scene taken from the respective perspective of the camera system, and ii) at least one depth sensor that captures and outputs the respective depth stream of the scene taken from the respective perspective.

In some embodiments, the color images in the color image stream of each respective depth and color stream are cropped images that are cropped during the refinement process.

In some embodiments, outputting the surface stream includes writing the surface stream to one or more command buffers of the renderer.

In some embodiments, the selected surface reconstruction process is executed in a runtime environment of the renderer.

According to some embodiments of the present disclosure, a method for producing a synthetic video image is disclosed. The method includes receiving video and depth inputs a camera system capturing a scene from a perspective, wherein the video and depth input is captured by a respective camera system and includes a video stream of the scene captured from the perspective and a depth stream of the scene captured from the perspective. The method further includes generating a depth and color stream based on the video stream and the depth stream. The depth and color stream includes i) a color image stream including a sequence of color images derived from the video stream, and ii) a refined depth image stream corresponding to the color image stream that includes a sequence of dense refined depth images that are refined by reprojecting depth images from the depth stream into respective color images of the video stream. Each dense refined depth image includes a grid of depth pixels that each indicate a respective depth value and respective color values derived from a corresponding color image. The method also includes generating a geometry video stream corresponding to the scene based on the depth and color stream, wherein the geometry video stream includes a sequence of geometry frames, each geometry frame having embedded therein, a respective color image and a respective dense refined depth image from the depth and color stream. The method further includes generating a surface stream based on the geometry video stream in accordance with a selected surface reconstruction process, wherein the surface stream includes a geometry stream that defines a geometry of an object captured in the scene, and a texture stream that is time aligned with the geometry stream that defines a texture of a surface of the object. The method also includes outputting the surface stream to a buffer and/or a renderer.

In embodiments, the surface reconstruction process is a tessellation process that is performed a general process graphics processor unit (GPGPU) is available process the geometry video stream. In some embodiments, generating the surface stream in accordance with the tessellation process includes: generating a pyramid of images based on a dense refined depth image of the depth stream, traversing the pyramid to assign values to each tile of the pyramid based on a total amount of depth disparity contained within each respective tile underneath the tile to obtain a tessellated geometry; texturing the tessellated geometry to obtain the texture of the tessellated geometry. In some embodiments, the pyramid is generated using Quadtree Pyramid Classification. In some embodiments, traversing the pyramid is performed using Quadtree Pyramid Traversal. In some embodiments, texturing the tessellated geometry includes performing edge refinement and projective texturing on the tessellated geometry.

In some embodiments, the surface reconstruction process is a vertex and surface reconstruction process that is performed when a GPGPU is unavailable to process the geometry stream. In some embodiments, generating the surface stream in accordance with the vertex and surface reconstruction process includes: generating a tessellated grid based on a dense refined depth image of the depth image stream, where each vertex in the tessellated grid represents a respective depth pixel; and rendering a texture corresponding to an object in the refined depth image based on the tessellated grid by perspective unprojecting each vertex in the tessellated grid into a space that is contained within the refined depth image along a frustum of a depth camera that captured the depth input. In some embodiments, the vertex and surface reconstruction process is mesh lattice unprojection.

In some embodiments, generating the depth and color stream includes: receiving user defined parameters, including a refinement mask, a minimum depth value, a maximum depth value, and a color image crop parameter; cropping each color image in the video stream based on the color image crop parameter to obtain the color image stream; and for each depth image in the depth stream: determining a segmented depth image by segmenting the depth image based on the minimum depth value and maximum depth value; determining a rectified depth image by reprojecting the segmented depth image into a corresponding cropped color image based on an intrinsic lens calibration of a video camera of the camera system, an intrinsic lens calibration of a depth camera of the camera system, and an extrinsic calibration between the video camera and depth camera; and determining a dense depth image by filtering the rectified depth image based on a detected edge of the object and the refinement mask. In some embodiments, determining the segmented depth image includes applying an automatic depth mask to each depth image in the depth stream, wherein the automatic depth mask is received in the user defined parameters. In some embodiments, the refinement mask is defined in a segmentation stream output by the video and depth input.

In some embodiments, the renderer generates a volumetric video content object based on the surface stream for inclusion in a three-dimensional rendering.

In some embodiments, the camera system includes i) a video camera that captures and outputs the video stream of the scene taken from the perspective of the camera system, and ii) at least one depth sensor that captures and outputs the depth stream of the scene taken from the perspective.

In some embodiments, the color images in the color image stream of the depth and color stream are cropped images that are cropped during the refinement process.

In some embodiments, outputting the surface stream includes writing the surface stream to one or more command buffers of the renderer.

In some embodiments, the selected surface reconstruction process is executed in a runtime environment of the renderer.

BRIEF DESCRIPTION OF THE FIGURES

The accompanying Figures where like reference numerals refer to identical or functionally similar elements throughout the separate views and which together with the detailed description below are incorporated in and form part of the specification, serve to further illustrate various embodiments and to explain various principles and advantages all in accordance with the systems and methods disclosed herein.

DETAILED DESCRIPTION

Figure 1:
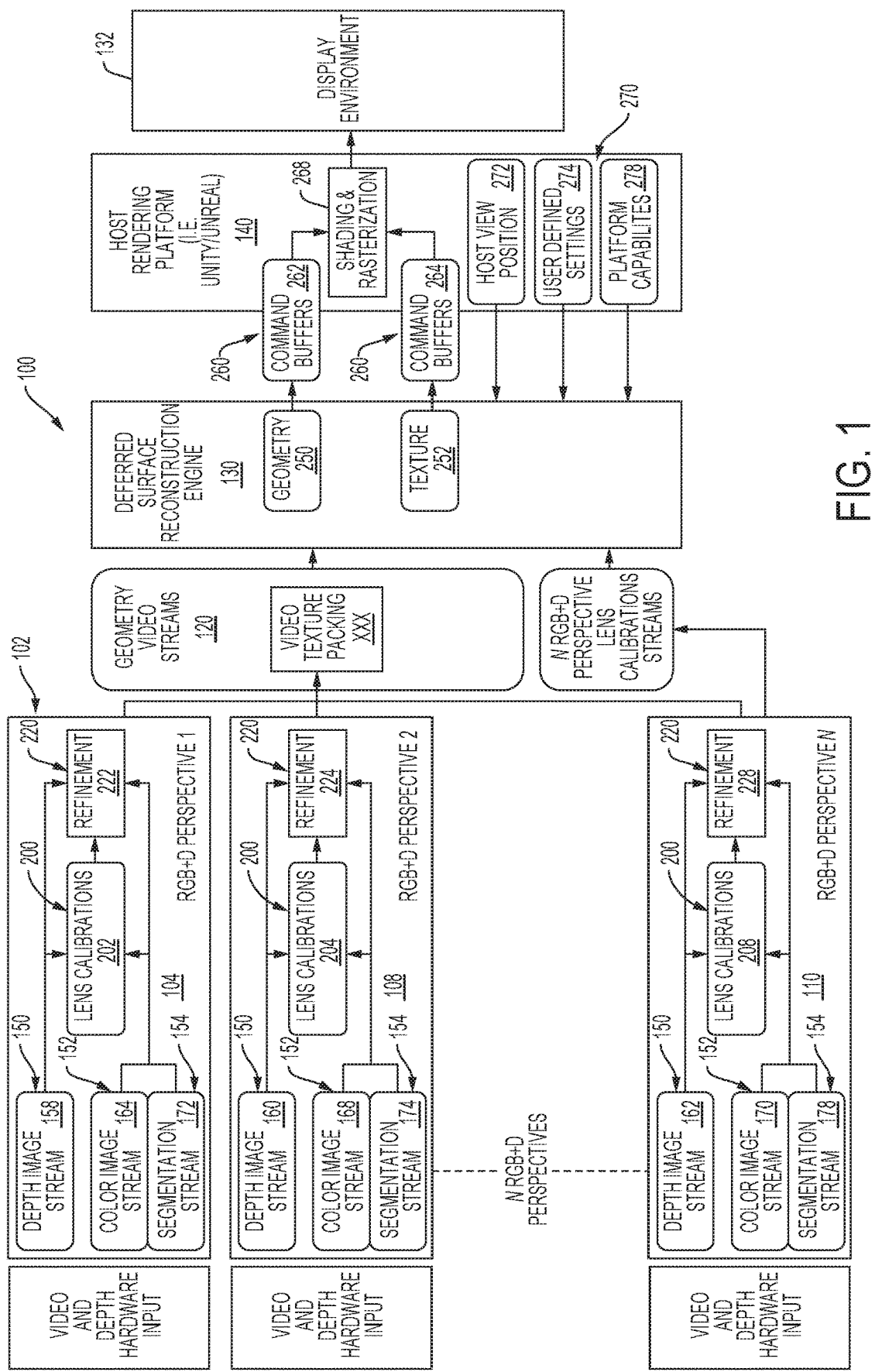
FIG. 1 is a diagrammatic view that depicts examples of a volumetric video content production platform including systems and methods in accordance with present disclosure.

The present disclosure will now be described in detail by describing various exemplary, illustrative, and non-limiting embodiments thereof with reference to the accompanying drawings. FIG. 1 depicts a volumetric video content production platform 100 (also referred to as the "content production platform" 100 or merely the "platform" 100) with components, modules, systems, interfaces, services, applications and other elements enabling the production of high-quality, volumetric video conveniently and at a low cost, also referred to herein as the content production platform 100, according to many embodiments. As depicted in FIG. 1, the content production platform 100 may receive video camera and depth inputs from one or more camera systems that capture depth information for a scene, and may process the video and depth inputs using a range of systems and methodologies, including a suite of editing tools, to produce volumetric video content objects that are structured for use in a variety of three-dimensional (3D) content creation and delivery environments. 3D content creation and delivery environments may include mediums in which 3D content may be created and/or displayed. 3D content creation and delivery environments may include, but are not limited to, 3D film environments, virtual reality environments, augmented reality environments, gaming engines or environments, non-linear storytelling environments, and the like.

In embodiments, the platform 100 may receive video and depth inputs 102 (e.g., video and depth inputs 104, 108, 110) from various hardware camera systems that capture video and depth information and may process those streams to produce one or more geometry video streams 120 that may include image and geometric information and/or to produce one or more lens calibration data streams 122 that include calibration information for lenses that were used to capture video, which reflect various perspectives from which video and depth inputs are captured. In embodiments, the video input is high resolution color video captured by a video camera and the depth input is a low resolution video with depth information captured by a depth camera (also referred to as a "depth sensor") indicating, at each pixel, a distance between an object depicted in the pixel and the depth camera.

In embodiments, the platform 100 may include a deferred surface reconstruction engine 130 that reconstructs a surface (including providing geometry and texture information) to be displayed in a display environment from color and depth information handled by the platform 100 including the deferred surface reconstruction engine 130, as described in this disclosure. The platform 100 may also include or provide input to a rendering platform 140 (such as a gaming engine) that renders output for one or more of the displays in the display environment 132. In embodiments, the deferred surface reconstruction engine 130 may be implemented in an SDK, such that surface reconstruction may be performed at a client application, such as a host rendering platform 140, such as Unity™ or WebGL™, or a 3D video editing software application, such as After Effects™, Maya™ or Cinema4D™. Alternatively, the deferred surface reconstruction engine 130 may be implemented in the same software application as the lens calibration systems 200 and refinement systems 220. In embodiments, the lens calibration systems 200 and/or the refinement systems 220 are implemented in the camera systems, such that a processing device of the camera system executes a respective lens calibration system 200 and/or refinement system 220. Alternatively, the lens calibration systems 200 and/or the refinement systems 220 may be executed by a processing device of a computing device that receives the video and depth inputs from the camera systems.

In embodiments, the inputs 102 to the platform 100 may be provided from video and depth capture hardware devices, systems, methods interfaces, and processes. The inputs 102 provided to or captured by the platform 100 may include various information streams, including depth image streams 150 that provide depth information about objects in a scene (e.g., the distance between an object depicted in a pixel and the depth sensor), color image streams 152 that provide color information (e.g., RGB and intensity values), and segmentation streams 154. In embodiments, the depth image stream 150, the color image stream 152, and the segmentation stream 154 taken from a respective camera system are time aligned. In some embodiments, the platform 100 provides the ability to receive input from multiple camera systems, such that each camera system outputs streams 150, 152, 154 captured from different perspectives, such that each camera system may be said to be captured from a respective perspective. Streams 150, 152, 154 captured from different camera systems may be identified and tracked accordingly, such that the platform 100 maintains awareness of the different perspectives during processing of information captured for a scene.

In the example of FIG. 1, the depth image streams 150 may include depth image streams 158, 160, 162 taken from different perspectives and the color image streams 152 may include color image streams 164, 168, 170 taken from different perspectives. By way of the many examples, exemplary hardware elements for capturing depth information including depth information streams may include systems like Microsoft Kinect™, Intel RealSense™, Occipital Structure Core™ and other depth sensing systems.

In embodiments, the color image streams 152 may include color image streams 164, 168, 170, and the segmentation streams 154 may include segmentation streams 172, 174, 178. In embodiments, the color image streams 152 and segmentation streams 154 taken from a respective perspective may be provided as inputs as individual streams or combined into a single stream. A segmentation stream may be a stream of frames, where each pixel in a respective frame indicates whether the pixel depicts a background (e.g., pixel value=0) or a foreground object (e.g., pixel value=1). In embodiments, the segmentation stream may be used as a refinement mask to isolate a foreground object from the rest of the image. In embodiments, a user may define the segmentation stream via graphical user interface or via an external file. Additionally or alternatively, the segmentation stream may be generated automatically.

In embodiments, the various depth image, color image and segmentation streams 150, 152, 154, or combinations or merged versions thereof, may be provided as inputs to one or more lens calibration systems 200. The lens calibration systems 200 (e.g., systems 202, 204, 208) may include both intrinsic calibrations (also referred to generally as "intrinsics" and extrinsic calibrations (or "extrinsics"). Intrinsic calibrations may refer to calibrations of a lens of a respective video camera or depth camera and extrinsic calibrations may refer to calibrations between the video camera and depth camera of a camera system. In embodiments, the calibration systems 200 may perform local calibrations, which may include lens intrinsics for both depth and color streams, as well as the pose between the respective lenses of the video camera and depth camera of a camera system (e.g., a 4×4 affine transform matrix that described the transform from the depth camera lens to the video camera lens). In embodiments, the lens calibration systems 200 can determine the local calibrations using standard camera calibration techniques using fiducials and in combination with well-known calibration algorithms (e.g., CalibrateCamera in OpenCV or other suitable calibration algorithms).

In embodiments where color and depth input are received from multiple camera systems (i.e., from multiple perspectives), the platform 100 may rely on a perspective pose (also referred to as "global extrinsic calibration information" or "global extrinsic calibration"). The perspective pose or global extrinsic calibration information may be calibration information that calibrates each of the camera systems to a common point in the space in which the scene is being captured. In some of these embodiments, each respective global extrinsic calibration may be a 4×4 matrix that transforms the respective perspective stream from its local camera space (e.g., the x, y, z voxel space from the point of view of the video camera and depth camera) into a unified common space (e.g., an x, y, z real world coordinate space) that is perspective agnostic. In these embodiments, each respective matrix may be used to calibrate a video/depth stream taken from a respective perspective to the unified common space. The calibration for each perspective may be determined in any suitable manner.

In embodiments, a global pose calibration system (not shown) may determine global extrinsic calibrations using an estimation method. In these embodiments, a set of shared points that are observable from each perspective may be identified and labeled in each respective stream (e.g., by a human via a user interface or by feature extraction). Once the shared set of points is labeled (e.g., point set A for perspective A, point set B for perspective B, etc., such that each set has the same number of points in the same order), the global pose calibration system may apply an estimation algorithm to determine each respective calibration matrix. Examples of estimation algorithms may include Estimate Affine 3D within OpenCV, which provides a RANSAC search algorithm to generate each matrix.

In some embodiments, the global pose calibration system may be configured to determine a global extrinsic calibration each respective perspective based on feature extraction and/or filtering processes. Examples of these processes include, but are not limited to, color-to-depth feature extraction and color-to-color feature extraction (which may require the cameras to be calibrated using a trackable object such as a checkerboard or fiducial), and depth-to-depth feature extraction (which does not require a trackable object). It is noted that in embodiments, the lens calibration system(s) 220 may be configured to perform estimation and/or any of the feature extraction techniques discussed above, such that the local calibrations and/or the global extrinsic calibrations may be based thereon.

In embodiments where the global pose calibration system employs depth-to-color feature extraction, the global pose calibration system may extract correlated 3D features from the trackable object based on observed colors. The global pose calibration system may identify and label points in the video camera feed taken from a respective perspective, and then may translate the location of each point into a 3D space by sampling the depth camera taken from the respective perspective. When all the points are identified and labeled from two or more perspectives, the global pose calibration system may then generate an estimated transformation for each respective perspective based on 3D point-to-3D point sets.

In embodiments where the global pose calibration system employs color-to-color feature extraction, the global pose calibration system may determine the calibration using a trackable object/calibration image of known size (e.g., a measured checkerboard). In these embodiments, the global pose calibration system may determine the local 3D positions of various points on the trackable object/calibration image given the size of the calibration based on the 2D pixels captured by the video camera and the known dimensions of the calibration image. The global pose calibration system may then use the color-to-color image sets from each perspective to build 3D point sets for the estimated 3D transformation. The global pose calibration system may then multiply the inverse of depth-to-color extrinsic transformation of each sensor (camera) by estimated 3D transformation to obtain the depth sensor's origin.

In embodiments where the global pose calibration system performs depth-to-depth feature extraction, the global pose calibration system may directly classify "interesting features" organically within a 3D depth image, similar to algorithms such as SIFT or AKAZE. In these embodiments, the global pose calibration system may receive depth images of a busy scene to classify the interesting features. The benefit of these techniques is that calibration may be performed without calibration objects and doesn't require translation from color images.

In some scenarios, certain features may not be found in every perspective. Thus, in some embodiments, the global pose calibration system is configured to daisy chain two or more matrices, so as to solve for transformations in these scenarios. In these embodiments, the global pose calibration system may solve the transformations from any two adjacent camera pairs, and then chain connecting solutions together to solve the entire system. For example, given a camera setup where four respective cameras are arranged in a diamond shape (e.g., North, East, South, and West), the global pose calibration system may extract similar features from images captured by adjacent camera pairs. For each pair of adjacent cameras, the global pose calibration system may estimate a transform. For example, the global pose calibration system may generate a generate a 4×4 matrix for the North to East pair (referred to as NorthToEast), a 4×4 matrix for the East to South pair (referred to as EastToSouth), a 4×4 matrix for the South to West pair (referred to as SouthToWest), and a 4×4 matrix for the West to North pair (referred to as WestToNorth). The global pose calibration system may further estimate a calibration transform from one of the perspectives (e.g., North) to a user defined "center" point (referred to as NorthToCenter). The global pose calibration system may then determine a set of universal transform matrices for each perspective, so as to transform a respective stream captured from a respective perspective into the same universal space based on the calibration transform and the transforms of the pairs of adjacent cameras. For example, in the example of the North, East, South, and West, the transform (e.g., 4×4 matrix) for each respective stream may be determined according to:

North Transform=NorthToCenter,//North to Center
East Transform=NorthToCenter*NorthToEast;//East to Center
South Transform=NorthToCenter*NorthToEast*EastToSouth;//South to Center
West Transform=NorthToCenter*NorthToEast*EastToSouth*SouthToWest; //West to Center It is noted that determining a transform for WestToNorth is redundant, but may be calculated for a parity check and/or error averaging, as marginal errors stack up the more matrices are applied in the chain.

In some embodiments, the platform 100 is configured to facilitate the calibration process as a byproduct of synchronous data capture. In these embodiments, the platform 100 may instruct a user of a client to capture a calibration shot. In response, the client returns a set of points identified in the calibration shot, if any. The client application may share points identified in multiple perspectives to the data set, with at least one entry between each camera pair. The user may then prompt the client application to initiate a calibration process to generate pair-wise transform matrices for each perspective that share one or more points. In response, the global pose calibration system may perform the calibration process. In some of these embodiments, the lens calibration system 200 may employ the matrix daisy-chaining technique to generate a universal set of transform matrices. In some embodiments, the global pose calibration system may determine reprojection errors and/or an inlier points based on the universal transform matrices, and may output the reprojection errors to the client application. The client application may present the reprojection errors and/or inlier points to the user and may request that the user provide a set of test images. The platform 100 may use the test images received from a set of responding client applications to visualize the respective calibrations/debugging purposes.

In embodiments, the various depth image, color image and segmentation streams 150, 152, 154, or combinations or merged versions thereof, may be provided as inputs to refinement systems 220. The refinement systems 220 (e.g., systems 222, 224, 228) may also receive inputs from the lens calibration systems 200 (e.g., instrinsics and extrinsics). Because typical depth sensing cameras are low-resolution and noisy, yet RGB color video sensing capabilities available in modern video cameras may be extremely stable, a sensor fusion technique in accordance with the present disclosure may be applied in a rectification and refinement step to rectify lens offsets, increase resolution, and stabilize depth images. In embodiments, the refinement systems 220 may calibrate each depth camera to the high-resolution color to which methodologies of the refinement systems 220 are applied.

In embodiments, one or more refinement systems 220 may use the fidelity of the video to stabilize and increase the resolution of the depth data to match the camera, providing clean, stable edges in the refined depth images. The refinement process combines low-resolution depth information with a high-resolution video signal to obtain refined depth images. This combination may produce a high quality synthetic video image that may be handled by volume-aware content systems.

In embodiments, a refinement system 220 may receive a depth image stream and a corresponding color image stream captured by a camera system (e.g., a video camera and depth sensor), and calibration information corresponding to the camera system, including for example, intrinsic calibration information relating to the depth sensor lens, intrinsic calibration information relating to the video camera lens, and extrinsic calibration information relating to a depth to color pose (e.g., a calibration between the depth sensor and the video camera of a respective camera system). The refinement system 220 may further receive user defined parameters via a graphical user interface presented by the platform 100. The user defined parameters may include a refinement mask stream containing one or more refinement masks, a minimum and maximum depth value range that indicates the minimum depth and the maximum depth of the area being filmed with respect to a respective camera system, a color image crop (e.g., a rectangular region of interest in the scene), and one or more refinement parameters (e.g., color, depth contribution, and/or filter scale). In some embodiments, the refinement system 220 may further receive an automatic depth mask stream containing a stream of one or more depth masks. In embodiments, a depth mask is an automatically generated mask segmentation image that is relative to the depth image.

In some embodiments, a refinement system 220 may execute three stages. In a first stage, the refinement system 220 may pre-mask the depth image. In these embodiments, the refinement system 220 may segment the depth image using the minimum and maximum depth values in the depth image, and if available may apply an automatic depth mask. In a second stage, the refinement system 220 may perform a perspective rectification. In these embodiments, the refinement system 220 reprojects the depth image into the color image based on the calibration information corresponding to the respective camera system (e.g., the intrinsic calibration information relating to the depth sensor lens, intrinsic calibration information relating to the video camera lens, and extrinsic calibration information relating to a depth to color pose), and may segment the rectified depth image by the color image segmentation stream (e.g., using a refinement mask). In the third step, the refinement system 220 may perform dense depth interpolation. In these embodiments, the refinement system 220 may filter the rectified depth image using a filter that is guided by edge information within the color stream (e.g., where the edge of an object is detected) and a refinement mask to create a dense depth image. In these embodiments, the refinement system 220 may infer depth values of pixels in the dense depth image using neighboring depth values and may infer an edge contribution of the pixels based on the edge contribution from the corresponding pixel in the color image. In embodiments, the refinement system 220 may infer an optical flow signal from the color stream to conduct temporal denoising on the depth image. In embodiments, the refinement parameters determine the amount to which the color edges are respected and/or a size of the hole-filling kernel. In embodiments, the resultant dense refined depth image is the same or approximately resolution of the input color image. In embodiments, the dense refined depth image is rectified to the color image and densely populated by pixels that are defined as of interested in the refinement mask. For each perspective, a refinement system 220 may output a depth and color stream that includes a depth stream containing a sequence of the dense refined depth images and a color stream containing a sequence of the cropped images. In embodiments, a depth and color stream may include a combination of a depth stream (containing a sequence of dense refined depth images) and a color stream (containing cropped color images). In some embodiments, the depth and color stream may be a Red, Green, Blue and Depth (RGB+D) stream.

In embodiments, a video texture packing module 136 (or "texture packing module" 126) may combine the depth and color streams corresponding to different perspectives into a single image stream, which may be referred to as a geometry video stream. A geometry video stream is a sequence of one or more geometry image frames (also referred to as "geometry frames"), wherein each geometry frame contains a color image (e.g., a cropped color image) and a depth image (e.g., a dense refined depth image) from each respective depth and color image stream. In embodiments, the video texture packing module 126 may time-align the depth and color image streams from each perspective and may insert corresponding time-aligned depth refined depth images and cropped color images from each respective depth and color image stream into a geometry frame. The video texture packing module 126 may iterate in this manner for each set of time aligned frames of the depth and color image streams to obtain the geometry video stream 120. In embodiments, through the refinement process, the foreground objects captured in the video and depth inputs are segmented from the background, such that the foreground objects are segmented from the background in the geometry frames of the geometry video stream. The geometry video stream 120 may be encoded into memory and/or may be streamed to a deferred surface reconstruction engine 130 that executes on a host platform, such as Unity™ or WebGL™.

In embodiments, the refinement process may be described as a super-resolution process. In a super-resolution process, the depth image may be re-projected into a color image using one of the local RGB+D calibrations 122. A pyramidal filter may then be used to recursively super-resolve the depth image to match the resolution of the color image. In embodiments, each fill-in step may be influenced by edge information of the color. Finally, a matte or color key may be provided to further improve edge stability. In embodiments, inter-frame optical flow from the color image may then be used to suppress high frequency surface noise in the super-resolved depth image. In this way, a super-resolution process may apply a sensor fusion methodology that: (i) re-projects depth information into a color image using a local RGB+D calibration; (ii) recursively super-resolves the depth image to match the resolution of the color image, such as using a pyramidal filter and (iii) uses inter-frame optical flow from the color stream to suppress high frequency surface noise from the super-resolved depth image.

In embodiments, the texture packing module 126 may output a geometry video stream 120 and the refinement systems 220 may output corresponding lens calibration streams for each perspective. As discussed, a geometry video stream 120 may include a sequence of geometry frames containing a combination of one or more depth images and color images of a scene taken from one or more respective perspectives; that is, each respective depth and color stream (e.g., RGB+D stream) perspective may include color information, such as information derived from the color image streams 152 and depth information, such as information derived from the depth image streams 154. For purposes of explanation, in scenarios where a scene is captured from multiple perspectives, the depth and color streams (e.g., RGB+D streams) may be referred to as depth and color perspective streams or RGB+D perspective streams, whereby each respective stream corresponds to a different respective perspective. The geometry video stream 120 and perspective lens calibration streams 122 may be associated with multiple depth and color perspective streams (e.g., RGB+D streams) of a scene, and may be tracked and handled accordingly by the platform 100.

In embodiments, a deferred surface reconstruction engine 130 may receive the geometry video stream 120 and the perspective lens calibration streams 122 as an input. Alternatively, the multiple depth and color perspective streams, such as those output by the one or more refinement systems 220, may be combined into a geometry video stream 120 by the deferred reconstruction engine 130. In embodiments, where the scene is captured from two or more perspectives, the multiple perspective lens calibration streams 122 may be combined into a single lens calibration input stream that is sent to and received as an input by the deferred reconstruction engine 130. In embodiments, the lens calibration stream(s) 122 may include intrinsic lens calibrations for each respective video camera, intrinsic lens calibrations for each respective depth sensor, depth-to-color poses of each camera system (local extrinsic calibration information), and, in the case of multiple perspectives, perspective pose in the real world space (global extrinsic calibration information). In embodiments, the deferred surface reconstruction engine 130 may further obtain a viewing position that indicates a virtual camera position of a viewer in relation to the virtual content object being rendered, a set of graphic compute capabilities of the host platform 140, and a density of the voxel field that will contain the virtual content object (the voxel field may also be referred to as the "projection space"). The density may be a default value or may be set by a user that indicates the size and number of voxels in the projection space.

The deferred surface reconstruction engine 130 may combine the received inputs to generate a surface stream. In embodiments, a surface stream may include a geometry data stream 250 and texture data stream 252 of a surface of an object being reconstructed. In embodiments, the deferred surface reconstruction engine 130 may provide the geometry and texture data streams 250, 252 as inputs to a host rendering platform 140, which generates a volumetric video content object based thereon. The geometry data stream 250 and the texture data stream 252 may be a sequence of view-dependent geometry and texture snapshots, whereby each snapshot may be used to render a volumetric video content object at a given instance of time (e.g., a single frame or over multiple sequential frames) from a given viewpoint (e.g., taken from the point of view of the viewer observing the object). In embodiments, the geometry and texture data streams 250, 252 may be received as inputs to the host rendering platform 140 through one or more command buffers 260, such as command buffers 262 dedicated to each of geometry and texture data streams 250, 252. The command buffers 260 may connect to a shading and rasterization engine 268, which may process the geometry and texture data streams 250, 252 and send the output from the shading and rasterization algorithm or process to the display environment 132 for viewing of the volumetric content object characterized by the geometry and texture information by a user of a display device. In some embodiments, the deferred surface reconstruction engine 130 may be integrated into the host rendering platform 140 via an SDK, such that the deferred surface reconstruction engine 130 is executed by the same processing system as the host rendering platform 140 and communicates directly with the host rendering platform 140. Alternatively, the deferred surface reconstruction engine 130 may communicate with the host rendering platform 140 via an API.

To trigger and facilitate appropriate surface reconstruction by the deferred surface reconstruction engine 130, the host rendering platform 140, in embodiments, may generate and/or receive a set of reconstruction parameters 270 that are provided to the deferred surface reconstruction engine 130. These reconstruction parameters 270 may include host view position data 272 that indicates a viewing position of a viewer (e.g., a current point of view of a viewer within a video game), user defined settings data 274 (e.g., settings that influence how a surface or other element should be displayed), platform capability data 278 (e.g., data indicating what graphics language or hardware capabilities can be utilized to render the video content object), and the like. In some scenarios, one or more of the reconstruction parameters 270 may be dynamically adjusted. For example, if the viewing position of the viewer is adjusted, the view position data 272 may be adjusted to reflect the change in viewing position. In embodiments, the reconstruction parameters 270 may be streamed to the deferred surface reconstruction engine 130, to determine or refine the geometry and/or texture data 250, 252 that the host rendering platform 140 may use to render a volumetric content object at a given instance of time. Thus, in embodiments, a feedback loop may be enabled between the deferred surface reconstruction engine 130 and host rendering platform 140, such that surface reconstruction is undertaken with an awareness of the nature of rendering by the host rendering platform, and vice versa.

Figure 2:
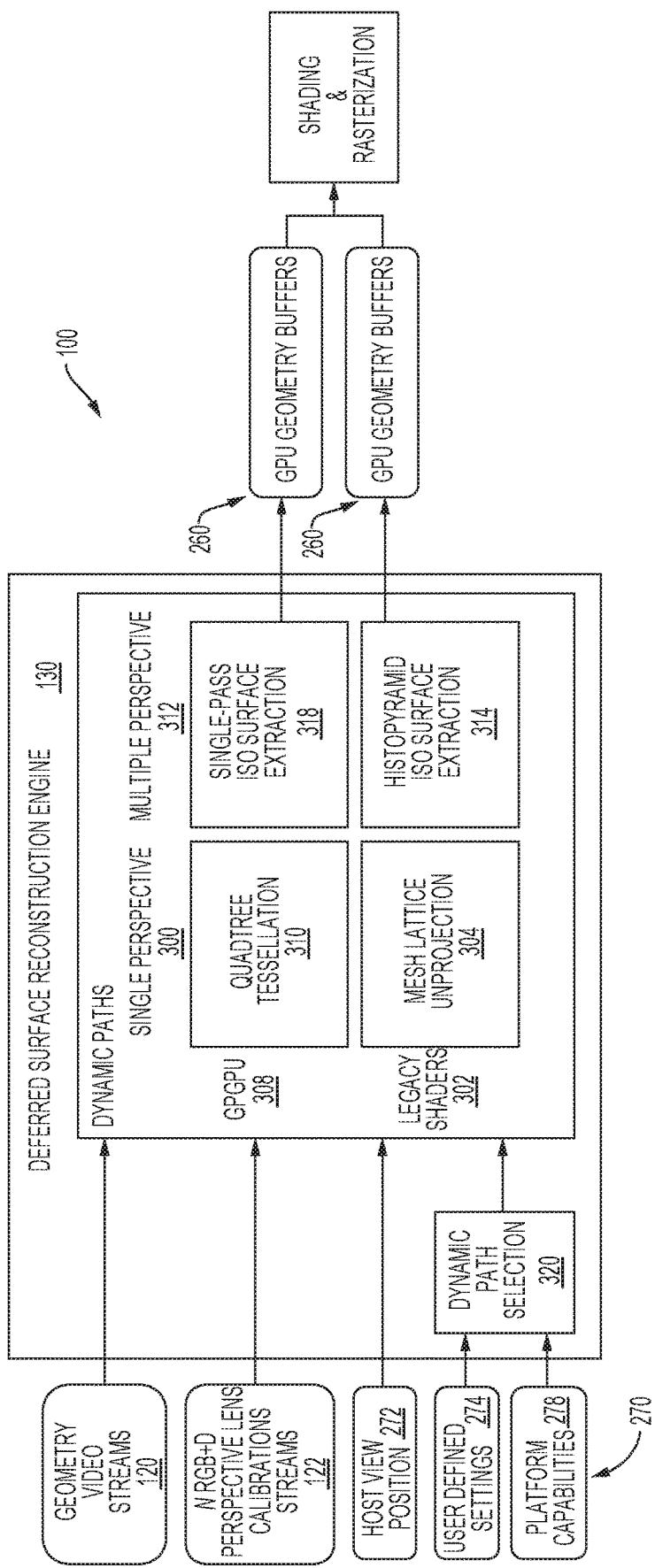
FIG. 2 is a diagrammatic view that depicts an exemplary deferred surface reconstruction engine including systems and methods in accordance with present disclosure.

FIG. 2 depicts embodiments of the deferred surface reconstruction engine 130 that may implement an algorithm for the content production platform 100 that may efficiently compress video input depth and color streams into planar image data. The planar image data may be stored, compressed, or streamed using traditional video techniques, while deferring surface construction and texture blending to a runtime environment to create a unified surface. As noted above, a host view position 272 is received by the deferred surface reconstruction engine 130 from a host rendering platform, such as at runtime, so that a surface is reconstructed with awareness of the particular point of view of a scene that is being rendered (e.g., a scene within a video game, AR, VR, or mixed reality environment).

Because surface reconstruction and texture blending computation may be deferred to a runtime environment, the density of the surface may be modulated dynamically at runtime. This may allow for dynamic levels of detail (LOD) of a video content object to be generated. For example, an object may be rendered at different levels of detail based on the point of view of an object (e.g., the object may be rendered with a lower level of detail if the object is relatively further away from the viewpoint of a viewer in an environment, or with a greater level of detail if the object is relatively closer to the viewpoint of the viewer). In another example, an object may be rendered at different levels of detail based on an awareness of the capabilities of the rendering platform (e.g., the object may be rendered at a lower LOD on a platform that is only capable of low-resolution display). Runtime surfaced reconstruction thus enables incorporation of a wide range of view-dependent optimizations, platform-dependent optimizations, optimizations based on user settings and preferences, and the like, that are not possible if surfaces are defined prior to runtime.

In embodiments, deferring surface reconstruction and texture blending computation to a runtime environment may also eliminate the need to create domain-specific formats or compression algorithms, as well as the need to store or read back from a graphics processing unit (GPU). Eliminating the need to create domain specific formats or compression algorithms may allow the deferred surface reconstruction engine 130 to use standard video files, existing video playback plug-in frameworks, compression and streaming. Also, eliminating the need to store or read back from a graphics processing unit (GPU) may bypass the need for computationally expensive geometry reduction and allow for use of complex geometric surfaces during playback that would otherwise require reduction to simpler surfaces.

Deferring surface reconstruction and texture blending computations to a runtime environment may also allow the surface reconstruction and texture blending processes to be optimized for live contexts, including real-time capture, streaming and playback of video content. As a result, the entire process may be optimized for real time streaming, including holoportation applications.

In embodiments, the deferred surface reconstruction process may involve a texture packing step and a surface reconstruction step. In embodiments, inputs 102 from multiple-perspective streams, including color steams 152, depth streams 150, and video track and segmentation streams 154 may be combined by a texture packing process into a simple texture. In embodiments of a texture packing process, each stream may be packed into a single video texture stream containing color, depth, and confidence information. Whichever packing approach is used, the resulting stream may then be saved to a video and compressed with standard video compression. In the case of multiple perspectives, four perspectives may be used, for example, to create a full 360° human capture; however, the platform is not necessarily limited in the number of perspectives that may be integrated, allowing for an arbitrary number of cameras or capture configurations. In embodiments, the texture packing step may include planar image transmission systems and retrofitting to existing codecs. Using the texture packing step may allow various image and depth streams to be synchronized, stored and transported together.

Referring to FIG. 2, surface reconstruction may be undertaken by a variety of different approaches, depending on the number of perspectives being handled for a given set of inputs 102 and/or depending on the capabilities of the available hardware system. In embodiments, the deferred surface reconstruction engine 130 may support dynamic path selection, where the deferred surface reconstruction engine 130 implements and selects from one of set of available rendering paths (also referred to as "surface rendering processes" or "rendering pipelines") based on one or more platform capabilities and/or the number of perspectives from which a scene is captured (e.g., whether the stream contains a single perspective or multiple perspectives). In embodiments, the case of only one perspective (e.g., only one camera system capturing video and depth inputs), the deferred surface reconstruction engine 130 may select an optimized single-perspective rendering path 300. Otherwise, the deferred surface reconstruction engine 130 selects a multi-perspective path 312. In embodiments, if the host platform 140 is executed at least in part by a graphics processing unit (GPU) and supports general purpose GPU (GPGPU) language (e.g., a modern graphics compute language that contains indirect drawing capabilities), the deferred surface reconstruction engine 130 may select a more efficient rendering path that takes advantage of the hardware capabilities of the rendering platform 140 (e.g., a GPGPU path 308). Otherwise, the deferred surface reconstruction engine 130 may select a legacy shader path 302. For example, in the case of a single perspective stream 300, a surface may be reconstructed using a mesh lattice un-projection process 304 when the rendering platform 140 is implemented with legacy shaders 302, or a quadtree tessellation process 310 when the rendering platform 140 is implemented with a general purpose graphics processing unit (GPGPU); while in the case of multiple perspective streams 312, a surface may be reconstructed using a single pass ISO surface extraction process 318 when the rendering platform 140 can access a GPGPU, or a histopyramid ISO surface extraction process 314 when the rendering platform 140 is implemented with legacy shaders 302.

In embodiments, when the deferred surface reconstruction engine 130 processes a single perspective stream 300 using a legacy shader, a simple vertex shader may create a perspective extrusion from a static vertex buffer using a mesh lattice un-projection process 304. By way of these examples, a fragment pass may then texture and cull unnecessary geometry. This playback method may be very portable and allow the deferred surface reconstruction engine 130 to be played on a variety of platform engines, such as web, mobile, or gaming engines. In embodiments, when the deferred surface reconstruction engine 130 processes a single perspective streams 300 that may be rendered in environments that support modern general purpose compute languages such as Microsoft's DirectCompute™ or Apple's Metal™ graphics languages, or general purpose graphics processing unit languages 308, a quad-tree tessellation approach 310, or the like, may be used.

In embodiments, when a geometric video stream containing multiple perspective streams 312 is processed on legacy shaders 302, a histopyramid ISO surface extraction process 314, or the like, may be used. When a geometric video stream containing multiple perspective streams 312 is processed on a general purpose graphics processing unit (GPGPU) that supports a GPGPU language 308, a single-pass ISO surface extraction process 318, or the like, may be used. In either approach, the deferred surface reconstruction engine 130 processes the multiple perspective streams (e.g., RGB+D streams corresponding to different perspectives) to obtain a respective volumetric weighted signed distance field or "voxel signed distance field" for each frame of the geometric video stream. In embodiments, each distance field is a three-dimensional grid of voxels, where each voxel contains a signed value representing a distance (e.g., an average distance) to an implicit surface captured in a geometry image frame of the geometric video frame. In embodiments, the deferred surface reconstruction engine 130 may determine a sign (e.g., + or −) for each voxel in a voxel signed distance field based on a classification (or "field classification) the voxel. The deferred surface reconstruction engine 130 may then, for each distance field, extract a respective surface. In some embodiments, where a GPU that supports a GPGPU language is executing the deferred surface reconstruction engine 130, the deferred surface reconstruction engine 130 may extract a respective surface from each respective distance field, for example using a graphics compute language accelerated derivative of marching cubes (e.g., Indirect Drawing). In some embodiments where surface reconstruction is performed by legacy shaders, the deferred surface reconstruction engine 130 may extract a respective surface from each respective distance field, for example using, a less sophisticated derivative of marching cubes (e.g., Histopyramid Traversal). In embodiments, a weighted view-dependent texture blending process may then be applied to the extracted surface, thereby texturing the final output of the deferred surface reconstruction engine 130 in real time.

Thus, the approach (and resulting graphics processing path) for surface reconstruction may be dynamically selected by a dynamic path selection system 320, such as based on the nature of the data streams (e.g., single- or multiple-perspective), the nature of the hardware system involved (e.g., whether GPGPU language support is available), and/or other pertinent factors.

In embodiments, at the surface reconstruction stage of deferred surface reconstruction, the texture stream and associated metadata may be interpreted to create a unified surface and texture at runtime (e.g., a volumetric video content object). Referencing extrinsic metadata, the packed texture may then be played back through video players, such as video players in game engines, for example.

When rendering with multiple depth cameras, it is often desirable to achieve the smoothest blending between projected content from the various input streams. In such cases, a weighted, view-dependent texture blending process may be used to achieve this outcome. When transitioning from one camera projection-mapped surface to another when rendering with multiple depth cameras, the weighted view-dependent texture blending process may, in embodiments, use the viewing angle from a first camera and compare the viewing angle to the direction from a second camera to acquire a contribution factor for every pixel that may be rendered with consideration to the scene's virtual view perspective. In multiple depth camera setups, a weighting system may be applied that weighs the content samples based on the blending factor that optimizes for content angles close to the virtual perspective, as well as the sum of all contributions from all the camera systems, resulting in a complete blended image where samples of high accuracy to the viewer are prioritized. In embodiments, camera metadata may be produced to represent the projection information required to perform the per pixel-weighted, view-dependent texture blending process and may be produced by a capture stage of the pipeline.

The following are examples of metadata from one or more cameras.

```
Metadata
{
    public int __versionMajor;
    public int __versionMinor;
    public string format;
    public int textureWidth;
    public int textureHeight;
    public Vector3 boundsCenter;
    public Vector3 boundsSize;
    public class Perspective{
        public Vector2 depthImageSize;
        public Vector2 depthPrincipalPoint;
        public Vector2 depthFocalLength;
        public float farClip;
        public float nearClip;
        public Matrix4x4 extrinsics;
        public Matrix4x4 extrinsicsInv;
        public Vector4 crop;
        public Vector3 cameraNormal;
        public Vector3 cameraCenter;
    }
    public Perspective[ ] perspectives;
}
```

In embodiments, a shader pipeline may calculate contributions of each perspective using the following pseudo code:
For each fragment on the extracted iso-surface, for each content cameras may do the following.
  Back project the world position of the current pixel fragment into the camera local space
  Convert the local normalized device coordinates (NDC) space coordinates to texture space coordinates
  Using the texture coordinates, calculate sampling regions for:
    High resolution color frame for the camera;
    Depth encoded frame for the camera for pixel occlusion tests; and
    Confidence data frame that indicates whether the region being samples in a projection space is a part of the ISO surface
  Calculate the view dependent weighting from the cosine angle between the scene camera direction and the content camera direction. The scene camera direction may be calculated per pixel from a vector between the projected local position of the sampled pixel fragment and the scene camera position.
  Obtain the confidence weighting sampled from the content texture and reject pixels that lay outside the ISO surface.
  Sample the depth region of the content texture, converting to gamma space if we are in linear space, then perform a Hue, Saturation, Value (HSV) conversion to improve the range of the depth sample.
  If the B (Value) component of the depth data of a pixel is below a threshold (0.2) then reject this projected pixel and move on to the next camera
  Linearize the actual depth value in the sampled depth data and compare our view space depth for the projected pixel to the depth sampled in the texture, if this is more than a threshold (0.05) then the pixel is occluded by closer geometry so skip to the next camera.
  If the projected pixel has passed both confidence and occlusion tests, sample the high resolution color frame, converting into gamma space if in linear space.

Accumulate the sample from this camera view using this blend equation:

accumulatedColor=
(accumulatedWeight*accumulatedColor+
mixedWeight*newColor)/(accumulatedWeight+
mixedWeight);

accumulatedWeight=accumulatedWeight+mixed-
Weight;

Where accumulatedWeight is the sum of weights from all cameras, accumulatedColor is the sum of color samples from all cameras, mixedWeight is the result of multiplying the view dependent blending and confidence blend weights together, and newColor is the current camera color sample.

Figure 3:
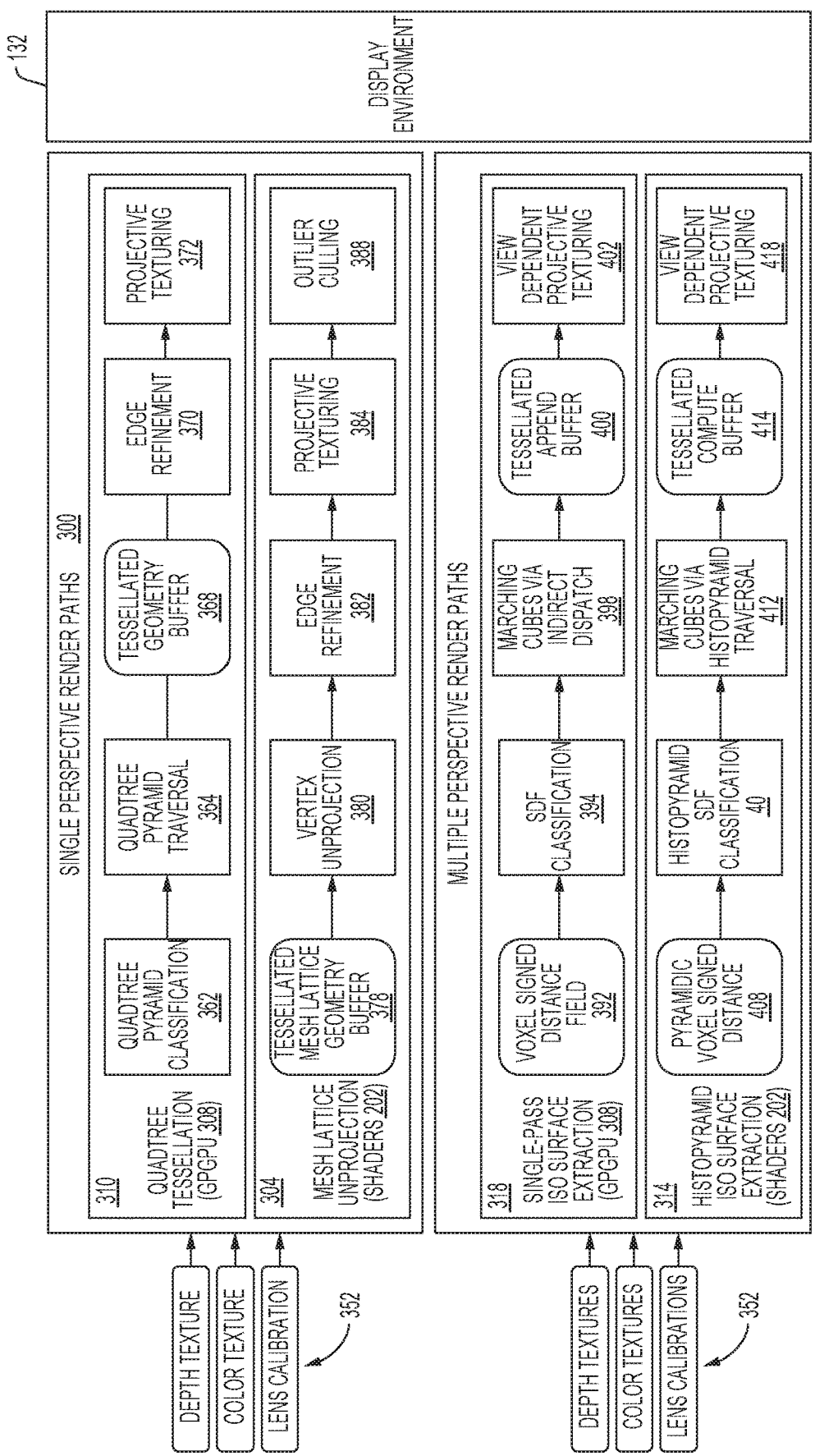
FIG. 3 is a diagrammatic view that depicts exemplary details on deferred surface reconstruction paths included in many systems and methods in accordance with present disclosure.

The sum of all weights and contributions in normalized terms should sum up to 1 to ensure a smooth and balanced transition between all camera outputs/content FIG. 3 depicts example embodiments that provide additional detail on various potential rendering paths 350 for surface texture information 352, such as the rendering paths discussed with respect to FIG. 2. The result of each rendering path is a 3D geometric representation of an object, such that the object can be viewed in real time within a host of different types of environments. For each frame of a single perspective geometry video stream or a set of time-aligned frames taken from a multi-perspective geometry video stream, the deferred surface reconstruction engine 130 may output a geometry and blended texture representing a surface captured by the one or more camera systems (video and depth inputs), that are suited to be rendered by a host rendering platform 140 at interactive frame rates.

In embodiments, the deferred surface reconstruction engine 130 may receive, as input, a geometry video stream, which may contain any number of respective perspective streams (e.g., a color image stream and a depth image stream). The deferred surface reconstruction engine 130 may also receive calibration information, including intrinsic lens calibrations for each respective video camera, intrinsic lens calibrations for each respective depth sensor, depth-to-color poses of each camera system (local extrinsic calibration information), and, in the case of multiple perspectives, perspective pose in the real world space (global extrinsic calibration information). The perspective pose or global extrinsic calibration information may be calibration information that calibrates each of the camera systems to a common point. In embodiments, the deferred surface reconstruction engine 130 may further receive as input a viewing position that indicates a virtual camera position of a viewer in relation to the virtual content object being rendered, a set of graphic compute capabilities of the host platform 140, and a density of the voxel field that will contain the virtual content object (the voxel field may also referred to as the "projection space"). The density may be a default value or may be set by a user that indicates the size and number of voxels in the projection space.

In embodiments, a quad-tree tessellation rendering path 310 may be executed for single-perspective streams in scenarios where the general purpose GPU (GPGPU) language support 308 is available. In some of these embodiments, the deferred surface reconstruction engine 130 may take advantage of the compute append buffer of the GPU to produce an adaptive mesh that tessellates densely on high disparity internal and external edges. In these embodiments, the deferred surface reconstruction engine 130 may generate a pyramid of images, where the base of the pyramid is the resolution of the input depth image stream. In some of these embodiments, the deferred surface reconstruction engine 130 may perform a Quadtree Pyramid Classification 362 to generate the pyramid. The deferred surface reconstruction engine 130 may then traverse the pyramid (e.g., from dense to sparse), assigning each value in the pyramid the total amount of depth disparity contained within each tile underneath, to obtain a classified pyramid. In embodiments, the deferred surface reconstruction engine 130 may perform a Quadtree Pyramid Traversal 364 to obtain the tessellated geometry (e.g., a tessellated surface). The tessellated geometry may then be written to a tessellated geometry buffer 368 of the GPU. The deferred surface reconstruction engine 130 may then texture the tessellated geometry (e.g., in a fragment shader). In these embodiments, the deferred surface reconstruction engine 130 may perform edge refinement 370 and projective texturing 372 to texture the tessellated geometry. In this approach, each independent frame of the geometry video stream is reclassified, and a new tessellation is generated and output to the host rendering platform for the duration of that frame.

In embodiments, a reprogrammable vertex and fragment rendering (e.g., Lattice Mesh Un-projection) pipeline may be performed as a fallback approach when there is not sufficient computing capabilities (e.g., no GPGPU) and the deferred surface reconstruction engine 130 is processing a single perspective stream. In these embodiments, the deferred surface reconstruction engine 130 may generate a densely tessellated grid geometry buffer 378, with one vertex for each pixel of the depth image stream. In some of these embodiments, the grid may be reduced by a factor of 2, 4, or 8 pixels per vertex to reduce rendering overhead. An edge preserving method is used to maintain visual fidelity. The deferred surface reconstruction engine 130 may render the texture with the geometry buffer bound. In the vertex shader, the deferred surface reconstruction engine 130 may perspective unproject (e.g., 2D to 3D) the vertices into a space that is contained within the depth image along the frustum of the depth sensor based on the lens intrinsics of the depth sensor. In some of these embodiments, the deferred surface reconstruction engine 130 may utilize samplings of neighbor pixels to move vertices off of the edge of the depth to match neighboring depth samples, such that edges are preserved in the fragment shader. In the fragment shader, the deferred surface reconstruction engine 130 may discard the fragments that fall on steep edges or are at the origin point of the depth camera perspective. The deferred surface reconstruction engine 130 may then texture the remaining geometry with the corresponding pixels in the color image.

In some embodiments, a single-pass ISO surface extraction rendering path 318 may be used for multi-perspective streams in situations where the general purpose GPU (GPGPU) 308 support is available. In these embodiments, the deferred surface reconstruction engine 130 may generate a voxel signed distance field for each geometry frame of geometry video stream. As discussed, a voxel signed distance field may be a three-dimensional grid of voxels, where each voxel contains a signed value representing a distance from the voxel to the implicit surface described in the corresponding geometry frame. In embodiments, the deferred surface reconstruction engine 130 may determine a voxel signed distance field classification for each voxel, in each distance field. In some embodiments, the deferred surface reconstruction engine 130 may project, for each voxel in a distance field, a point representing the voxel into each depth image depicted in a respective geometry frame using the global extrinsic calibration and the depth camera lens intrinsics of each respective depth camera. The deferred surface reconstruction engine 130 may then register, for each voxel, whether the point representing the voxel is behind the surface (contained), in front of the surface (outside), or has no data (undetermined). The deferred surface reconstruction engine 130 may then, for each voxel that is registered as within or in front of the surface, determine an average distance to the surface to obtain the classification. If the voxel is outside the surface, the average distance from the voxel may be assigned a positive sign. If the voxel is in front of the surface, the average distance from the voxel may be assigned a negative sign. The deferred surface reconstruction engine 130 may perform the foregoing for each respective geometry frame of a geometry video stream.

Once the distance field classifications have been determined for a set of distance fields of a corresponding set of time aligned frames from the multiple perspective fields, the deferred surface reconstruction engine 130 may perform an ISO-surface extraction technique such as Marching Cubes (e.g., via Indirect Drawing), in conjunction with a tessellated Append Compute Buffers 400 of the GPU to extract a tessellated mesh (an explicit surface) from the signed distance field. In embodiments, once the surface has been extracted, the deferred surface reconstruction engine 130 may generate a view dependent projective texturing. In some of these embodiments, the deferred surface reconstruction engine 130 may compute, for each geometry frame, a texture for the surface extracted in connection with the geometry frame. In these embodiments, each fragment of the surface may be projected into the color texture of each perspective. The deferred surface reconstruction engine 130 may calculate a weighted average of the texture, where the weight may be calculated based on the dot product between the view position, the source camera's perspective, and a normal vector of the extracted surface. In embodiments, the weighting favors texture samples from source cameras that are relatively more parallel to the perspective of the view position, which may optimize on-axis textures. In some embodiments, the deferred surface reconstruction engine 130 may eliminate texture contributions from a source camera system, if the geometry extracted from the output of the source camera is occluded from the field of view of the viewing position and/or back-facing angles are detected with respect to the viewing position.

In scenarios where the host platform 140 does not support GPGPU and/or does not support Compute Append Buffers, the deferred surface reconstruction engine 130 may execute a histopyramid ISO-surface extraction. In these embodiments, the deferred surface reconstruction engine 130 may generate a voxel signed distance field for each geometry frame of the geometry stream, as was discussed with respect to the single-pass ISO-surface extraction. Once the distance field classifications have been determined for a set of time aligned frames of the multiple perspective fields, the deferred surface reconstruction engine 130 may use, for example, a histo-pyramid classification schema to determine the number of triangles that will be in the mesh. In these embodiments, the deferred surface reconstruction engine 130 may render the mesh using direct rendering with the number of triangles contained in a pyramid base. In embodiments, once the surface has been extracted, the deferred surface reconstruction engine 130 may generate a view dependent projective texturing. In some of these embodiments, the deferred surface reconstruction engine 130 may compute, for each frame of the set of time aligned frames, a texture for the surface extracted in connection with the time-aligned frame. In these embodiments, each fragment of the surface may be projected into the color texture of each perspective. The deferred surface reconstruction engine 130 may calculate a weighted average of each texture, where the weight may be calculated based on the dot product between the view position, the source camera's perspective, and a normal vector of the extracted surface. In embodiments, the weighting will favor texture samples from source cameras that are relatively more parallel to the perspective of the view position, which may optimize on-axis textures. In some embodiments, the deferred surface reconstruction engine 130 may eliminate texture contributions from a source camera system, if the geometry extracted from the output of the source camera is occluded from the field of view of the viewing position and/or back-facing angles are detected with respect to the viewing position.

It is noted that in some embodiments, view-dependent texturing occurs at the rate of refresh of the host rendering platform 140, and not at the rate of playback of the geometry video. For example, a surface being depicted in a virtual reality environment may render at, for example, 90 Hz, while the geometry video may only be updating at, for example, 24 Hz. For each frame rendered by the host platform, the surface texturing may be updated, while the geometry only updates upon an update from the geometry stream.

Figure 4:
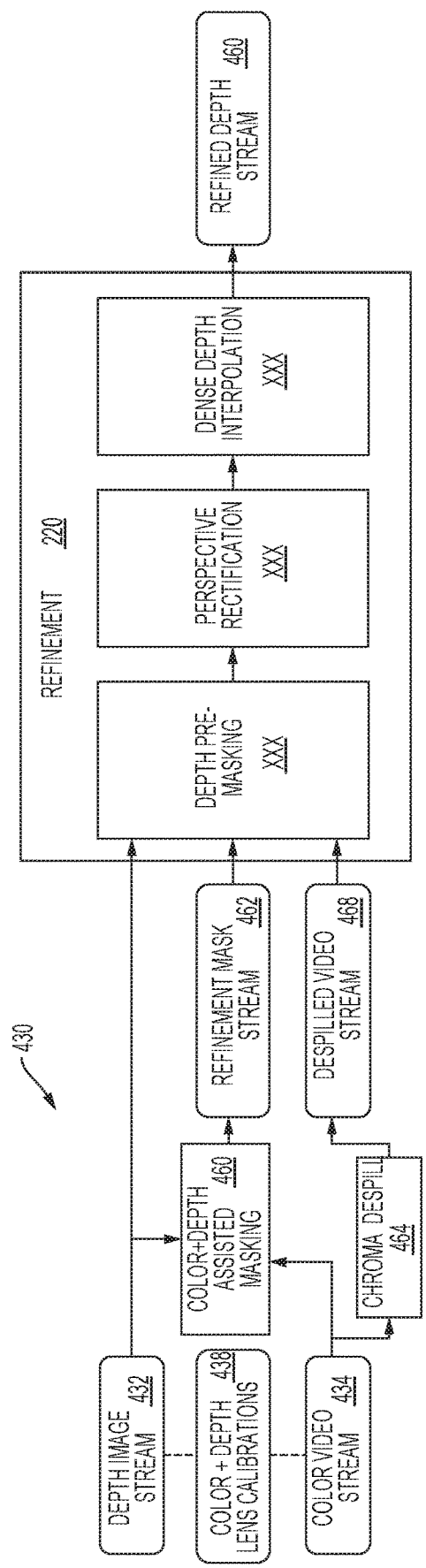
FIG. 4 is a diagrammatic view that depicts exemplary refinement processes and systems in accordance with present disclosure.

FIG. 4 depicts example embodiments of a refinement system 430 that may include, integrate with or connect to the refinement systems 220 (FIG. 1) and into the various systems 222, 224, 228, as needed. With reference to FIGS. 1 and 4, the refinement system 430 may combine low-resolution depth information, such as the information included in the depth image streams 150 with a high-resolution video signal, such as the information included in the color image streams 152, as well as color and depth lens calibrations 200, to produce a high-quality synthetic video image that may be handled by volume-aware content systems.

In embodiments, the refinement system 430 may receive a depth stream and a corresponding color stream captured by a camera system (e.g., a video camera and depth sensor), and calibration information corresponding to the camera system, including for example, intrinsic calibration information relating to the depth sensor lens, intrinsic calibration information relating to the video camera lens, and extrinsic calibration information relating to a depth to color pose. The refinement system 430 may further receive user defined parameters via a graphical user interface presented by the platform 100. The user defined parameters may include a refinement mask stream. In embodiments, a refinement mask is a binary image corresponding to an image of the video input, where white pixels represent user defined areas of interest. The user defined parameters may further include a minimum and maximum depth value range that indicates the minimum depth and the maximum depth of the area being filmed with respect to a respective camera system, a color image crop (e.g., a rectangular region of interest in the scene), and one or more refinement parameters (e.g., color, depth contribution, and/or filter scale). In some embodiments, the refinement system may further receive an automatic depth mask stream containing a stream of one or more depth masks.

In some embodiments, a refinement system 430 may execute three stages. A refinement system 430 may receive a depth image stream 430 and a color video stream 432, which may be calibrated using color and depth lens calibrations 438 (e.g., color and depth intrinsics) as input. In embodiments, a color and depth assisted process may be used to extract the region of interest from the background in order to generate a refinement mask stream. In some of these embodiments, a chroma-despill process may be applied to the color stream in order to remove chroma bounce (e.g., green glow) from the color video prior to supplying it to the refinement system.

Initially, a pre-masking module 470 may pre-mask the depth image. In these embodiments, the pre-masking module 470 may segment the depth image using the minimum and maximum depth values in the depth image, and if available may apply an automatic depth mask. In embodiments, a perspective rectification system 474 may then perform a perspective rectification on the segmented depth image. In these embodiments, the perspective rectification system 474 reprojects the depth image into the color image based on the calibration information corresponding to the respective camera system (e.g., the intrinsic calibration information relating to the depth sensor lens, intrinsic calibration information relating to the video camera lens, and extrinsic calibration information relating to a depth to color pose), and may segment the rectified depth image by the refinement mask stream. In embodiments, a dense depth interpolation module 478 may perform dense depth interpolation on the rectified depth image. In these embodiments, the dense depth interpolation module 478 may filter the rectified depth image using a filter that is guided by edge information (e.g., where the edge of an object is detected) and a refinement mask to create a dense depth image. In these embodiments, the dense depth interpolation module 478 may infer depth values of pixels of the dense depth image using neighboring depth values and may infer an edge contribution of the pixels based on the edge contribution from the corresponding pixel in the color image. In embodiments, the dense depth interpolation module 478 may infer an optical flow signal from the color stream to conduct temporal denoising on the depth image. In embodiments, the refinement parameters determine the amount to which the color edges are respected and/or a size of the hole-filling kernel. In embodiments, the resultant dense refined depth image is the same or approximately resolution of the input color image. In embodiments, the dense refined depth image is rectified to the color image and densely populated by pixels that are defined as of interested in the refinement mask. The dense depth interpolation module 478 may output a refined depth stream 480 that is comprised of a sequence of dense refined depth images.

For each perspective, a refinement system 220 may output a depth and color image stream containing depth image stream comprising a sequence of the dense refined depth images and a color image stream comprising a sequence of the cropped images. In embodiments, the depth and color image stream is a Red, Green, Blue and Depth (RGB+D) stream. As discussed, a depth and color image stream may be combined with depth and color image streams from different perspectives to obtain a geometry video stream, which may be encoded into memory and/or may be streamed to a deferred surface reconstruction engine 130 that executes on a host platform, such as Unity™ or WebGL™.

Figure 5:
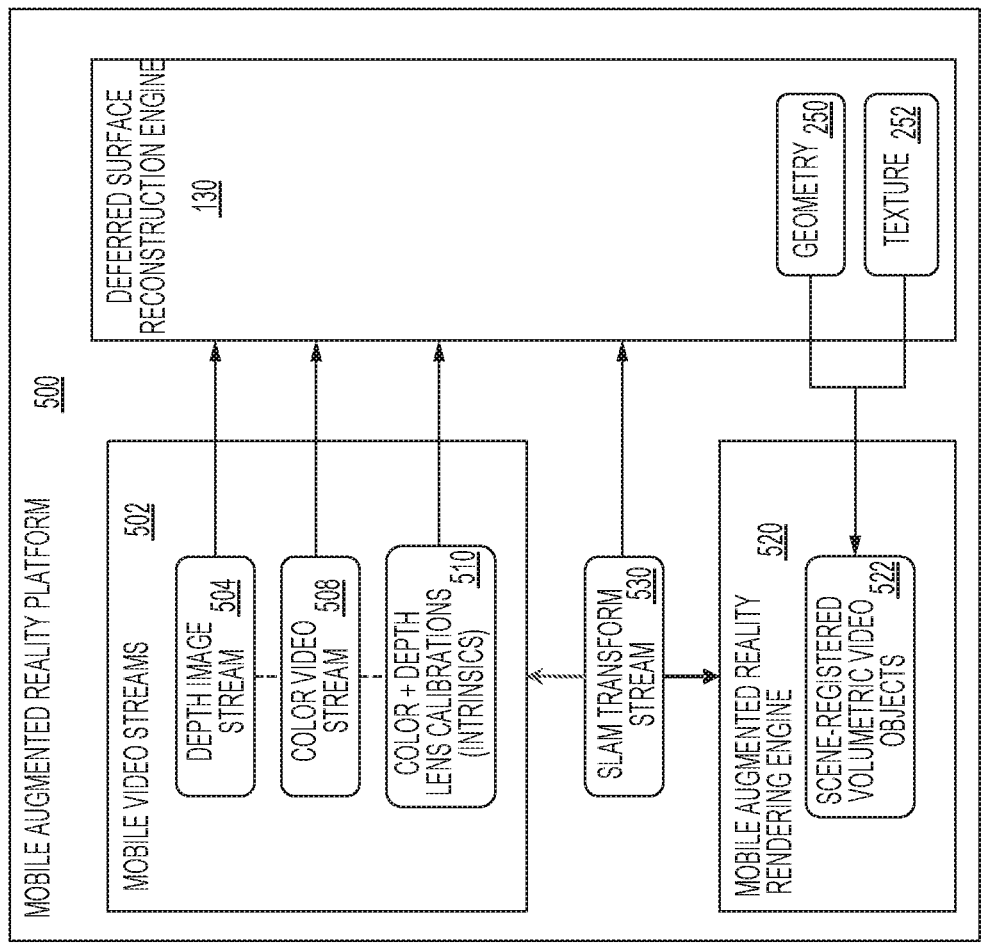
FIG. 5 is a diagrammatic view that depicts exemplary real-time mobile device volumetric capture and display processes for augmented reality included in many systems and methods in accordance with present disclosure.

The content production platform 100 may include, integrate with, connect to, or interface with a mobile device augmented reality platform 500. FIG. 5 depicts many embodiments of the mobile augmented reality platform 500 may produce a content data structure/object that may be captured using a video camera and depth data stream of a mobile device, processed, and may be adapted for insertion into an augmented reality application that runs on a mobile device in real time. The content production platform 100 may include, integrate with, connect to, or interface with the mobile augmented reality platform 500 and may capture a use pattern. By way of these examples, the mobile augmented reality platform 500 may capture the images and display them tandem within augmented reality. As such, the mobile augmented reality platform 500 may reference the use pattern and may be configured so that the images captured and display remain attached to the world where they were captured in AR environment. In embodiments, the content data structure/object may include a set of pixels captured via a 2D imaging system that may be augmented by depth information that may enable the object to be handled by 3D features of an augmented reality application.

In embodiments, the mobile augmented reality platform 500 may capture mobile video data and image streams 502, such as the depth image streams 504, color video streams 508, color and depth lens calibration streams 510, and may send the streams to the deferred reconstruction engine 130 described herein. In certain examples, the mobile augmented reality platform 500 may use, include, or integrate with Apple' ARKit™, Android's ARCore™, and the like.

In embodiments, deferred surface reconstruction engine 130 may then produce geometry stream 250 and the texture stream 252 and send those streams to a mobile augmented reality rendering engine 520. The mobile augmented reality rendering engine 520 may include and receive the streams from the deferred surface reconstruction engine 130 to develop scene-registered volumetric video objects 522. In embodiments, the mobile augmented reality platform 500 may also include, connect to, or integrate with a simultaneous localization and mapping (SLAM) system 530, which may provide a SLAM transformation stream that provides extrinsic information about the location and orientation of a mobile device within the world, which in turn may be used as information for rendering volumetric video objects, such as ones that may be presented as overlays in an augmented reality application to be rendered on a mobile device. This enables 3D volumetric objects captured using mobile platforms to be immediately displayed within augmented reality on the same device and remain registered to the augmented reality scene in the true location of capture. This is achieved by applying the inverse matrix of the mobile device's per-frame location during capture in combination with the current location during viewing. In embodiments, the SLAM transformation stream 530 may provide information to the mobile augmented reality rendering engine 520, the deferred surface reconstruction engine 130, or other components, such as to assist with view-dependent rendering and other capabilities noted throughout this disclosure.

FIGS. 6, 7, 8 and 9 depict a user interface (UI) 600 of the content production platform 100. The UI 600 may allow a user of the content production platform 100 to produce 3D content, for example by manipulating at least six degrees of freedom for a 3D volumetric object, without required the user to edit computer code. The UI 600 may also allow a user of the content production platform 100 to define a non-linear narrative for the behavior of a 3D volumetric object in response to inputs.

Figure 6:
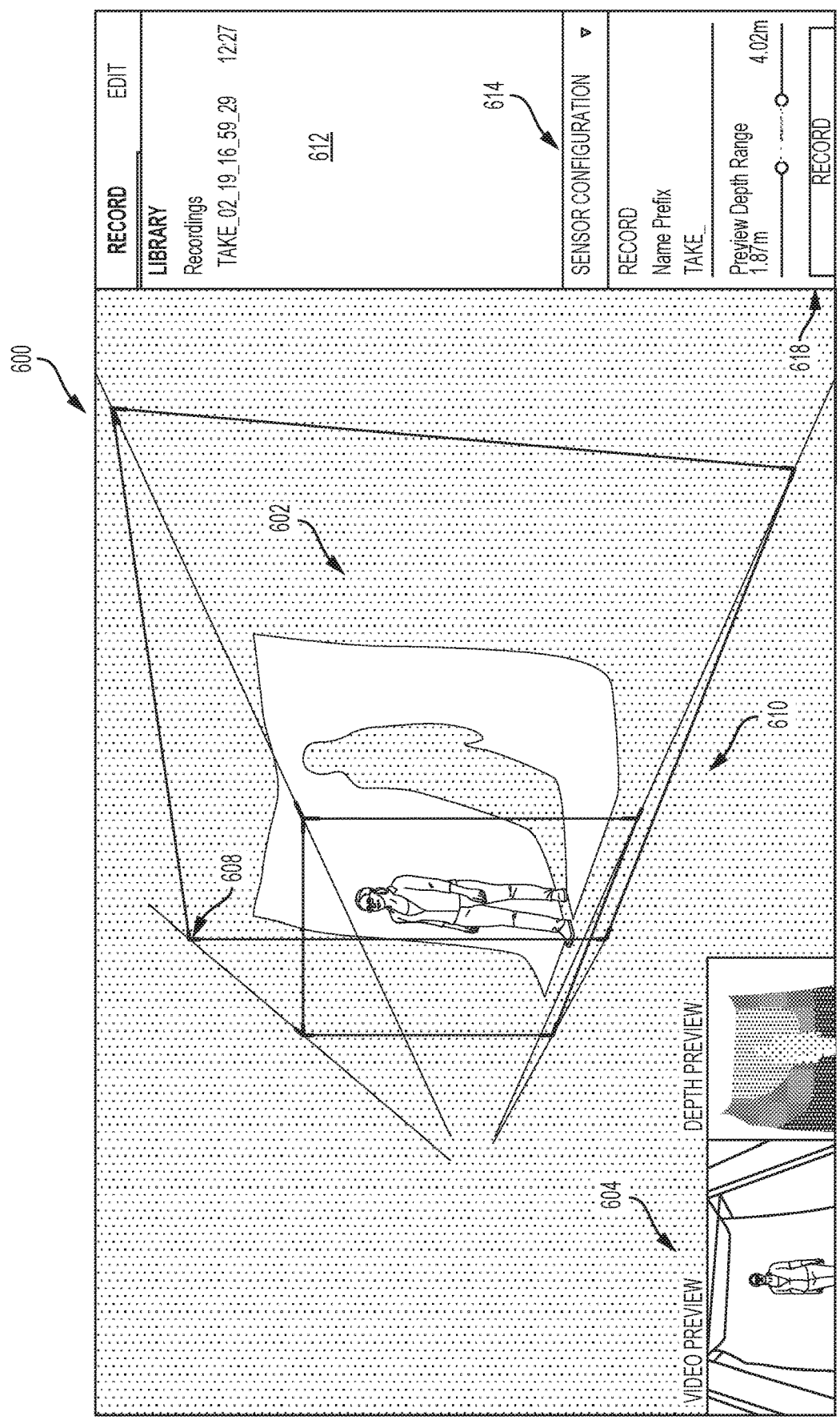
FIGS. 6, 7, 8, and 9 are diagrammatic views that depict an exemplary user interface (UI) of the content production platform of FIG. 1 included in many systems and methods in accordance with present disclosure.

FIG. 6 depicts many embodiments of the UI 600 to allow a user to record alternate views of a 3D volumetric video object. In the examples depicted in FIG. 6, the 3D volumetric video object being recorded is a person and includes a 3D front-side rendering 602 of the person being recorded by the content production platform 100. The corresponding 2D dimensional rendering 604 of the person captured by one of the input cameras connected to the content production platform 100 is also depicted in FIG. 6. By way of the above examples, a user may select to view the 3D rendering, using view selection tools 608.

In these examples, a user of the content production platform 100 may rotate the 3D rendering generated by the content production platform 100 using navigation tools 610, resulting in the 3D rendering being viewed from the front-side angle of view. The white areas of the 3D rendering 602 in these examples may be being rendered by data streams being captured by the content production platform 100. Shaded areas, such as the area behind the person, may be areas for which no data is available to be represented in the 3D rendering 602. In this example, data may be captured from sensors located in front of the person, as also depicted in the 2D rendering 604. Because no data is being captured from behind the person, the content production platform 100 represent the area behind the person as transparent, as depicted in the 3D rendering 602

In embodiments, the UI 600 may also include a recording log 612. The recording log 612 may include a list of recordings made by a user of the content production platform 100 and make the recordings easily accessible to the user. The UI 600 may also display metrics depicting the status and health of the content production platform 100 and may also allow the user to input configuration parameters 614. The user may initiate a record sequence by pressing the record button 618.

Figure 7:
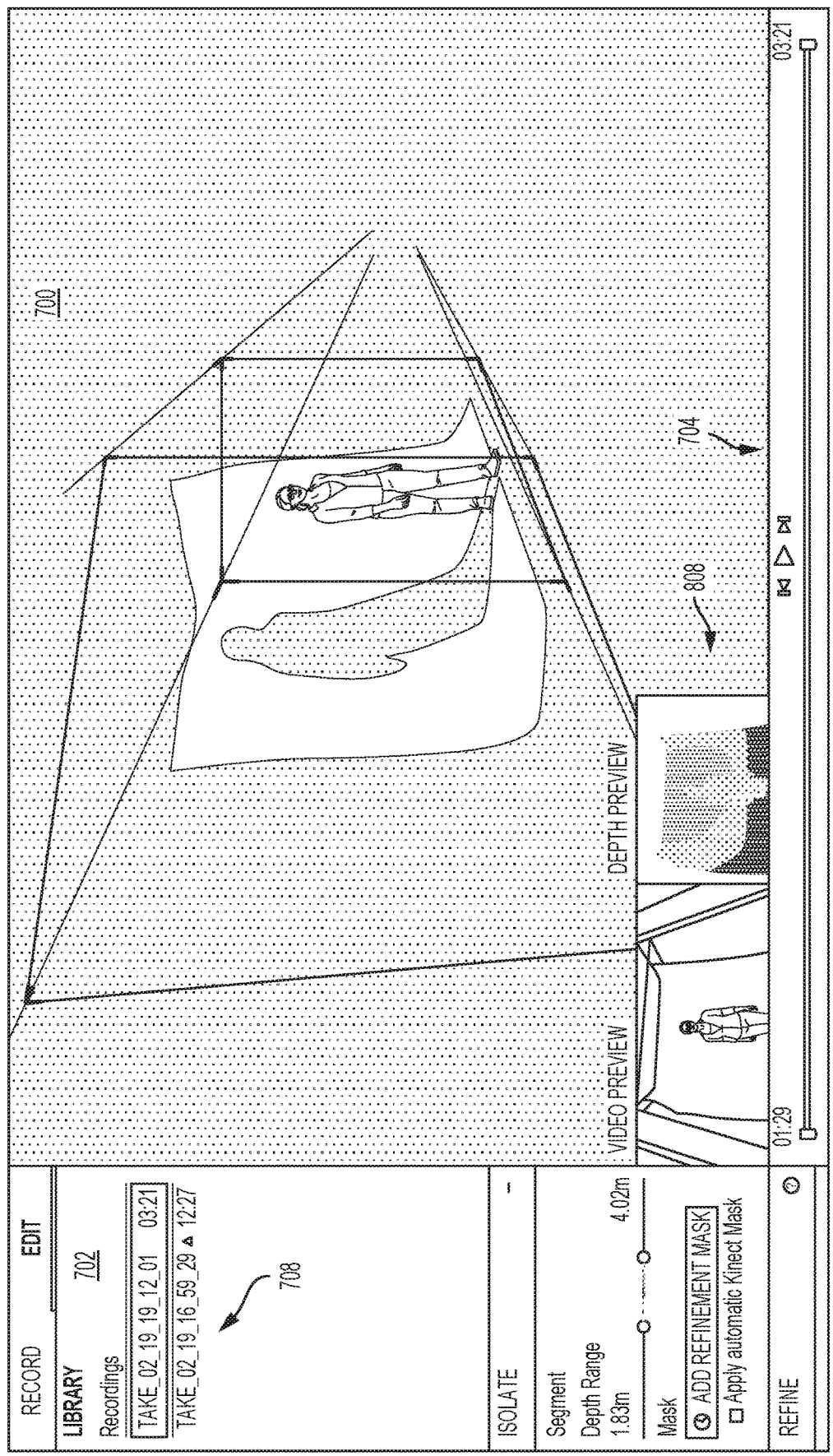

FIG. 7 depicts many embodiments that include an editing and media management UI 700 may display allow a user to display a contextual queue and shooting context, make compositions 702, link footage not controlled by the content processing system and provide additional media management functions. In embodiments, a user may make compositions using combinations of settings and files, as well as setup and adjust the super-resolution process. The editing and media management UI 700 may also display the 3D rendering 602, as well as a timeline 704, allowing the user to view and edit, for example, by removing the background of a rendering, the 3D rendering 602 at various points in time. A user may select the 3D rendering 602 to view from a list of source clips 708.

Figure 8:
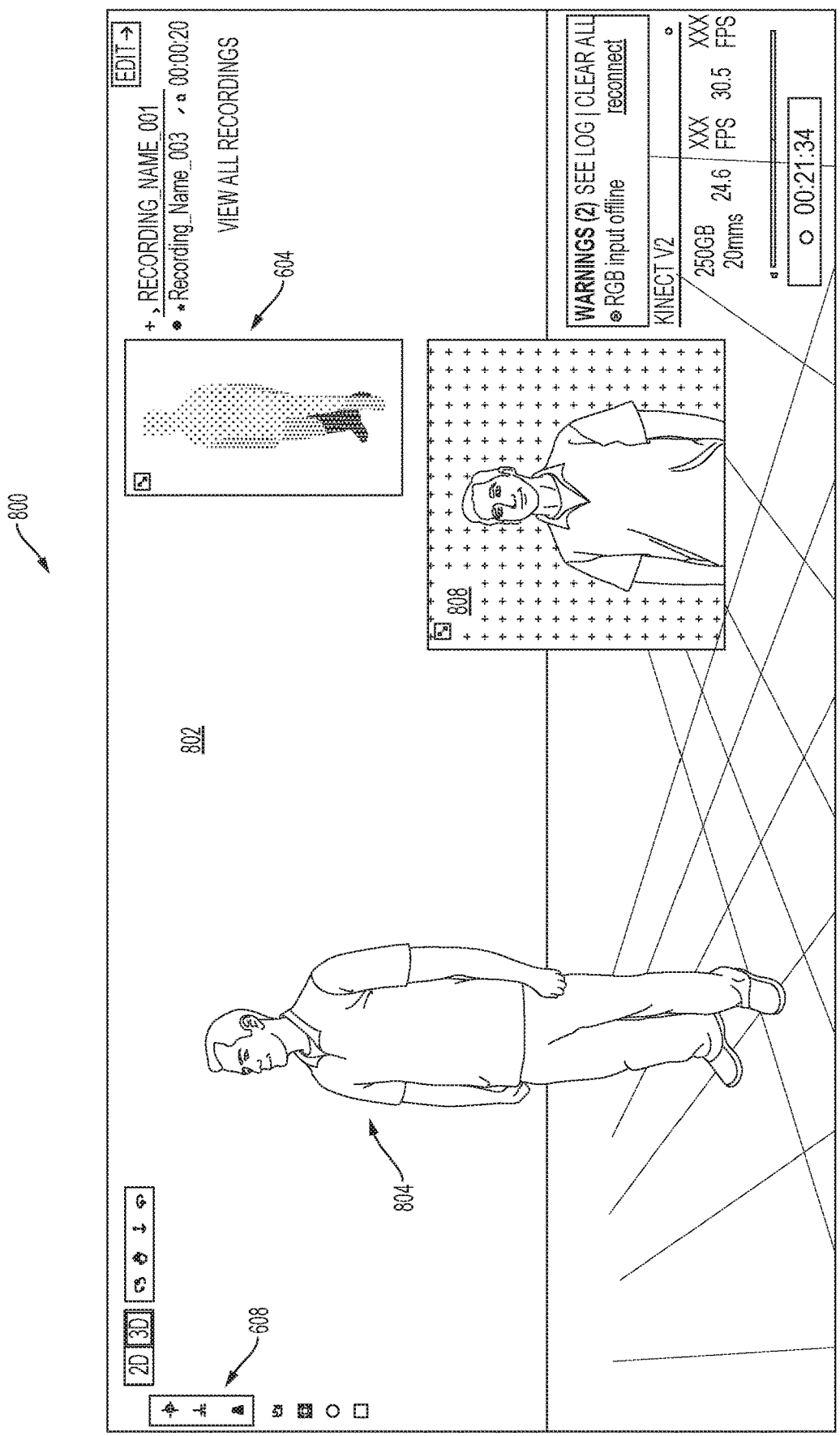

FIG. 8 depicts many embodiments that include a capture U 800 that may capture a live feed. The capture UI 800 may present the user with live feeds from a depth sensor and video camera, allowing the user to view the live feed in both a planar 2D rendering 604 and navigable 3D rendering 602, allowing the user to frame the capture in real time. The capture UI 800 may include informative non-photoreal rendering modes 802 designed to provide user feedback, for example, in a hue-encoded depth map, including an interactive 3D scene 804, containing a feed from the depth sensor fused in real-time with a stream from the video camera, and 2D or 3D customizable inspection views 808, allowing a user precisely monitors the live feed recording.

Figure 9:
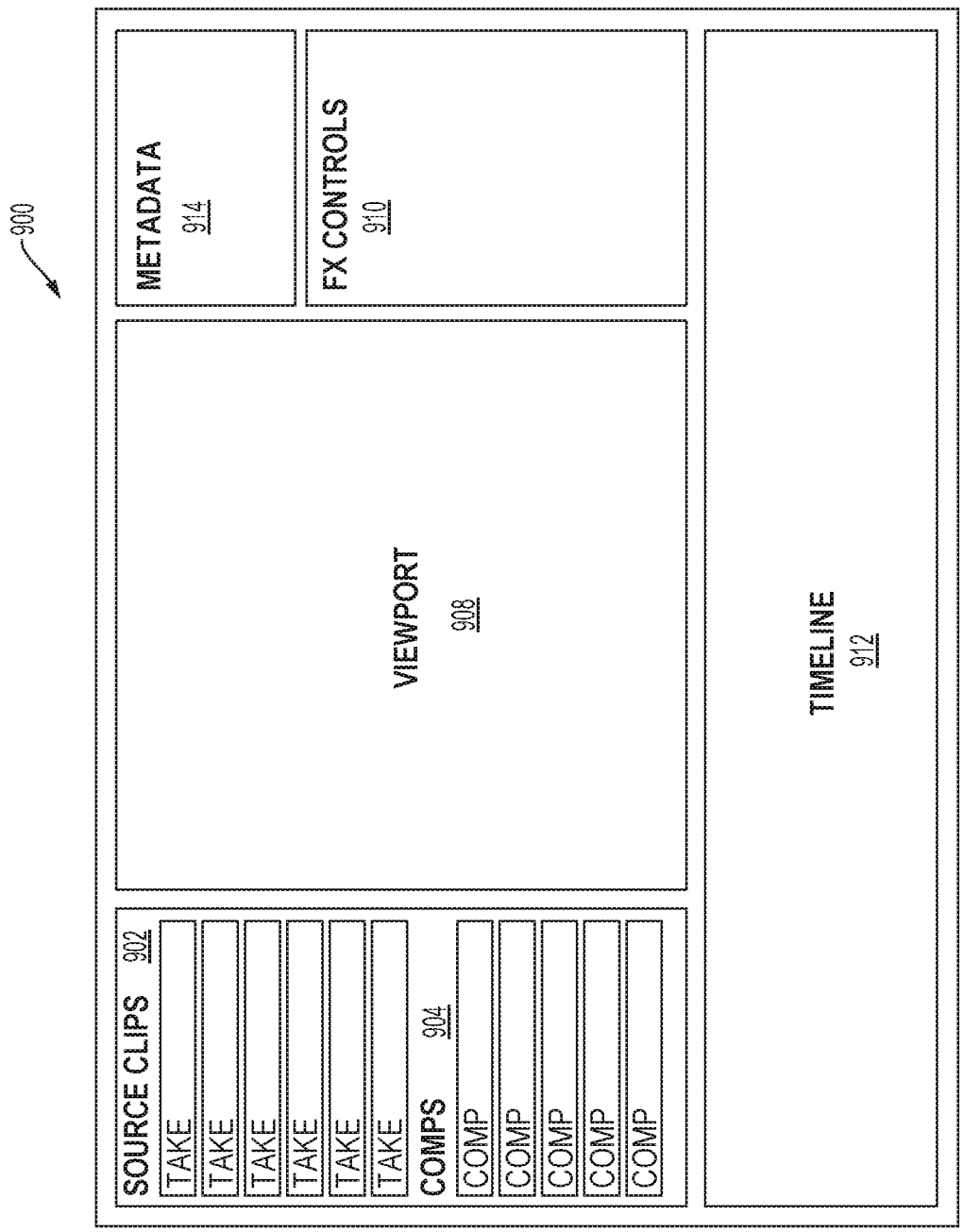
Figure 10:
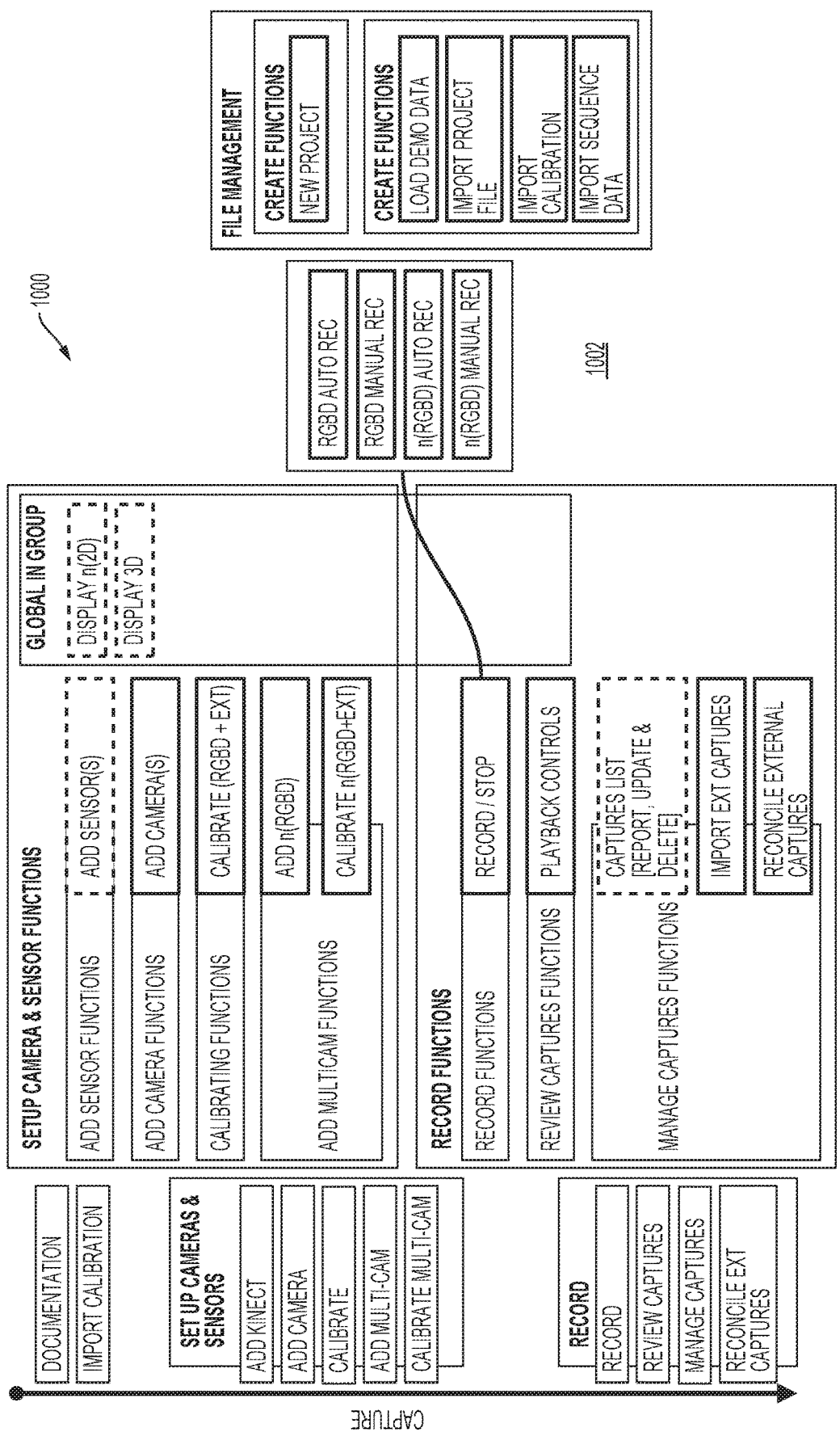
FIGS. 10, 11, 12 and 13 are diagrammatic views that depict an exemplary three-stage workflow of a content processing system included in many systems and methods in accordance with present disclosure.
Figure 11:
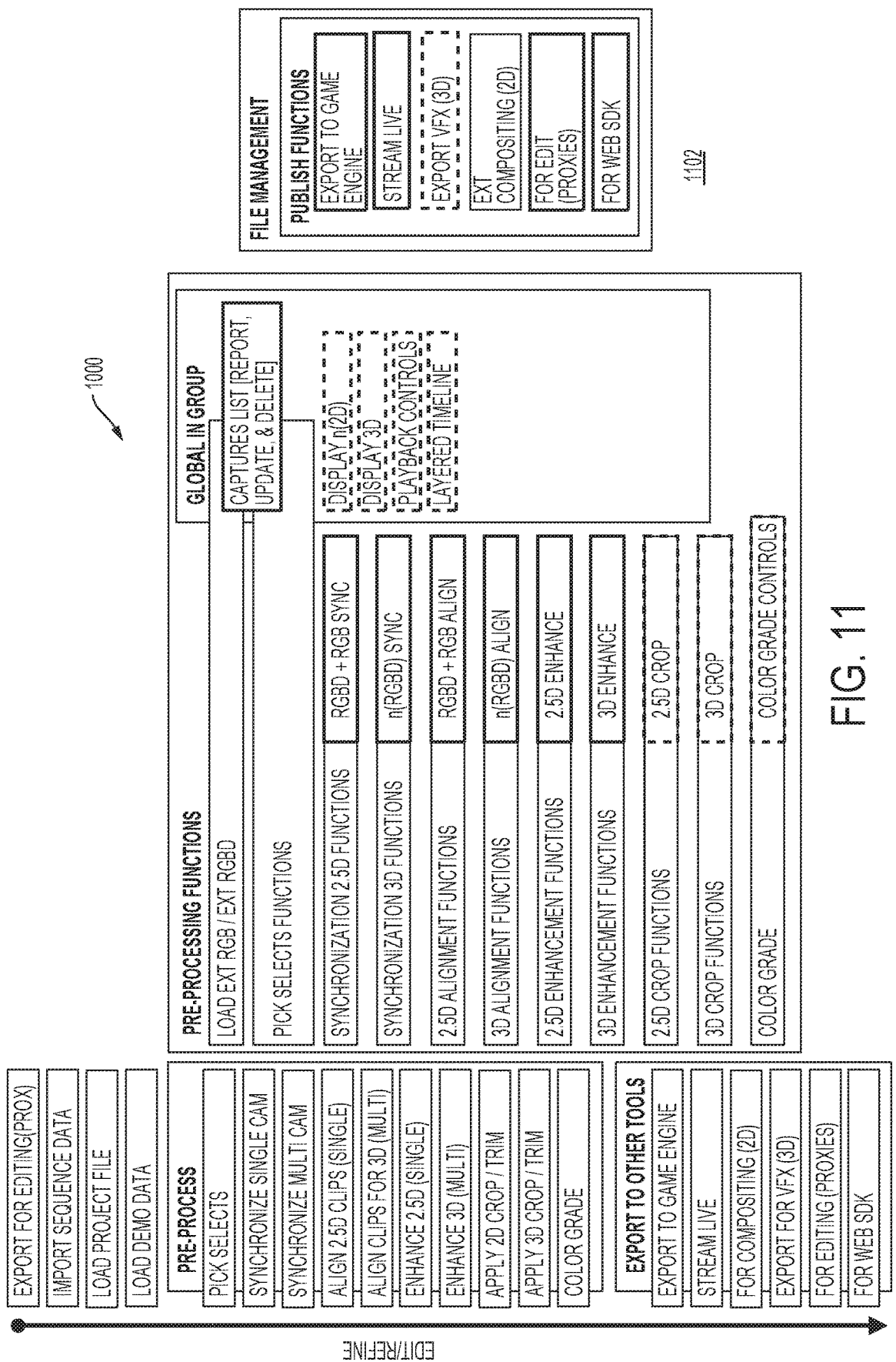

FIG. 9 depicts many embodiments that include an editor UI 900 that may allow a user to view and manipulate their stored recordings in both planar 2D renderings 604 and navigable 3D renderings 602 (FIGS. 6, 7, and 8). The editor UI 900 may allow a user to select a source clip 902 or composition 904 and view the selected source clip 902 or composition 904 in a viewport 908. In embodiments, the editor UI 900 may allow a user to make improvements to a selected rendering, such as by using the FX controls 910. One or more improvements may include noise reduction, segmenting a character from a background, and the like. The editor UI 900 may also allow a user to then add 3D aesthetic effects. By way of these examples, all parameters may be animated on a timeline 912 using key frames, curves and a dope sheet. An editor UI 900 may also allow a user to manage metadata 914 associated with a selected rendering.

Figure 12:
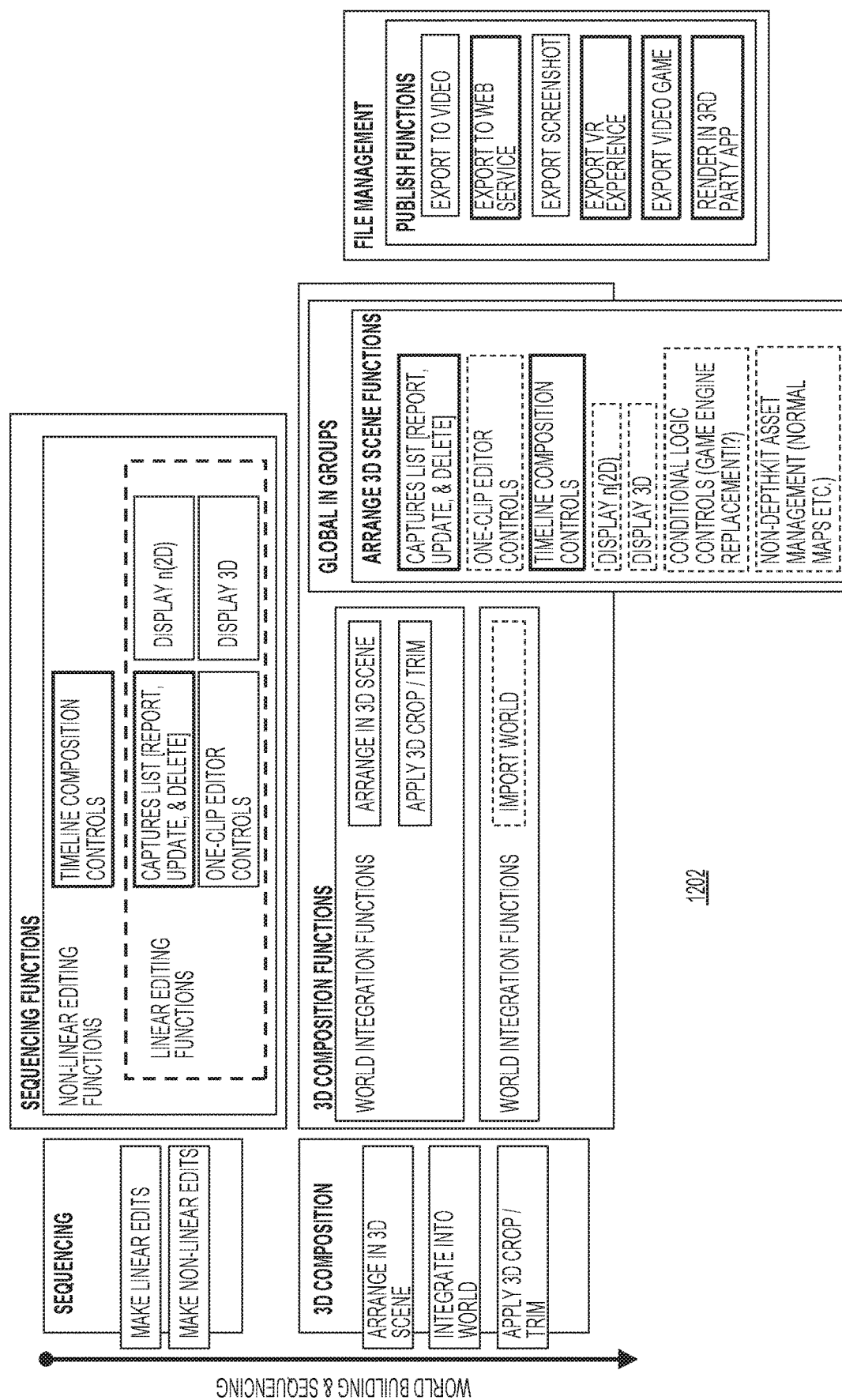
Figure 13:
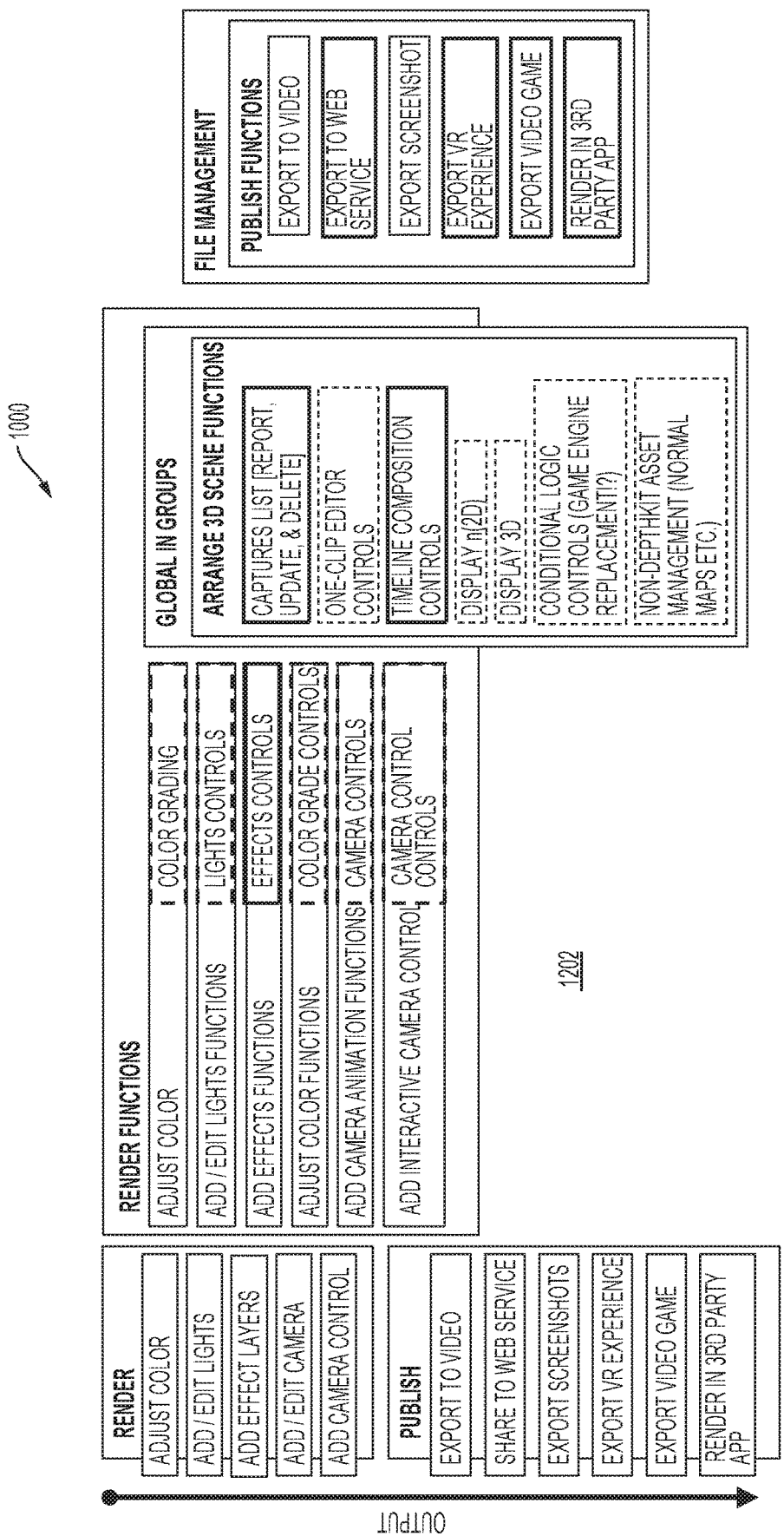

FIGS. 10-13 depict a three-stage workflow 1000 of a content processing system. In a capture stage 1002, the video stream may be recorded by a user utilizing the capture UI 800 (FIG. 8). The capture stage 1002 may be followed by an edit stage 1102, where a user edits a source clip 902 or composition 904 utilizing the editor UI 900 (FIG. 9). FIG. 12 depicts many embodiments of a building and sequencing stage 1202 in which a user may combine and sequence multiple source clips 708 and compositions 702 (FIG. 7) into a single stream. FIG. 13 depicts many embodiments of an output 1302 that may contain and display the multiple sources.

Figure 14:
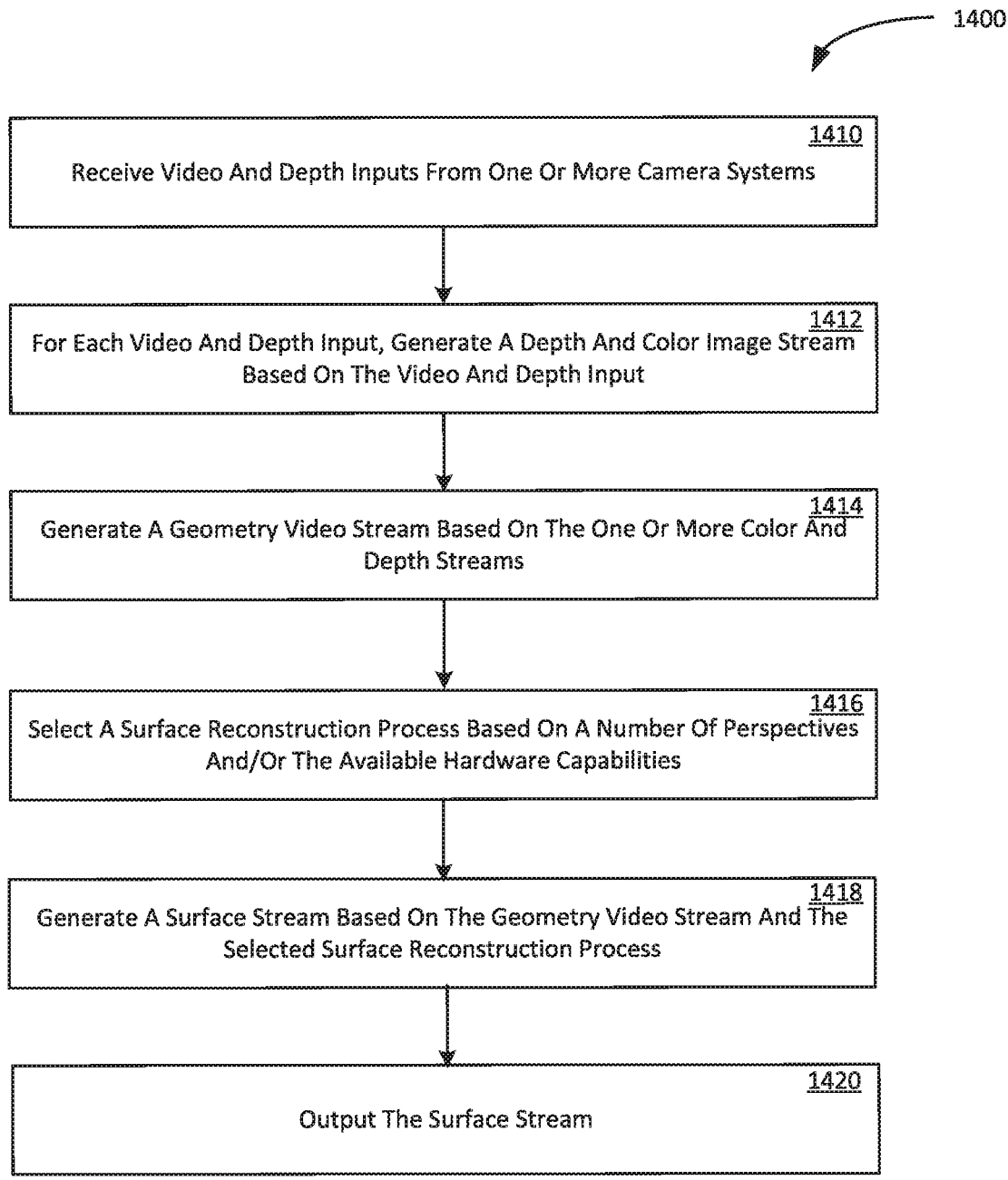
FIG. 14 is a flow chart illustrating a set of operations of a method for generating a surface stream of an object captured in a scene, according to some implementations of the present disclosure.

FIG. 14 illustrates an example set of operations of a method 1400 for generating a surface stream, according to some embodiments of the present disclosure. The method 1400 is described with respect to the system 100 of FIG. 1. The method may be performed, however, by other suitable components and/or systems.

At 1410, a refinement system may receive video and depth inputs from one or more respective camera systems. In embodiments, the refinement system may receive video and depth inputs (e.g., video and depth inputs 104, 108, 110 of FIG. 1) from various hardware camera systems that capture a capture a scene being filed and output video and depth information depicting the scene. In embodiments, a camera system may include a video camera and a depth camera (which may also be referred to as a "depth sensor"). The video camera may output a video stream that includes high resolution color video captured by a video camera. The depth camera may output a depth stream that includes low resolution video with depth information captured by a depth camera indicating, at each pixel, a distance between an object depicted in the pixel and the depth camera. In embodiments, the video stream and the depth stream are time aligned. Furthermore, in embodiments, each camera system may output a segmentation stream corresponding to the video stream, where each frame of the segmentation stream is time aligned to a respective frame of the video stream and, therefore, a respective frame of the depth At 1412, the refinement system(s) may generate a depth and color image stream for each respective camera system based on the video and depth inputs. In embodiments, a depth and color image stream may include a depth image stream of depth refined images and a color image stream of cropped color images. In embodiments, the refinement system (or a set of two or more distributed refinement systems) generates the depth and color image streams based on a refinement process, which is described in greater detail with respect to FIG. 15. In embodiments, a depth and color image stream may include a depth image stream containing combination of a sequence of dense refined depth images and a sequence of cropped color images.

At 1414, a texture packing module generates a geometry video stream based on the one or more depth and color image streams. As discussed, a geometry video stream includes a sequence of geometry frames, where each geometry frame includes one or more color images and one or more corresponding depth images. In embodiments, the color images are cropped color images and the corresponding depth images may be dense depth refined image taken from the same perspective. The texture packing module may receive one or more depth and color image streams. In the case of multiple perspectives, the depth and color image streams may be time-aligned to one another. In embodiments, the texture packing module may generate the geometry video stream based on the received depth and color images by generating a sequence of geometry image frames. The texture packing module may embed respective color image (e.g., cropped color images) and depth image (e.g., dense depth refined images) pairs into a geometry frame, whereby the number of color image and depth image pairs embedded into each geometry frame is equal to the number of perspectives at which the scene was captured.

At 1416, a deferred surface reconstruction engine selects a surface reconstruction process based on the number of perspectives from which the scene is captured and/or the hardware resources available to perform the surface reconstruction. In embodiments, the deferred surface reconstruction engine may support dynamic path selection, where the deferred surface reconstruction engine implements and selects a surface rendering process from a set of surface rendering processes based on one or more platform capabilities and/or the number of perspectives from which a scene is captured (e.g., whether the stream contains a single perspective or multiple perspectives). In embodiments, the case of only one perspective (e.g., only one camera system capturing video and depth inputs), the deferred surface reconstruction engine may select an optimized single-perspective rendering path. Otherwise, the deferred surface reconstruction engine selects a multi-perspective process. In embodiments, if the host platform includes a GPGPU that supports a GPGPU language (e.g., a GPU that can process a modern graphics compute language that contains indirect drawing capabilities), the deferred surface reconstruction engine may select a more efficient rendering path that takes advantage of the hardware capabilities of the rendering platform (e.g., a GPGPU path). Otherwise, the deferred surface reconstruction engine 130 may select a legacy shader path. For example, in the case of a single perspective stream, a surface may be reconstructed using a mesh lattice un-projection process when the rendering platform is implemented with legacy shaders, or a quadtree tessellation process when the rendering platform includes a GPGPU. In the case of multiple perspective streams, a surface may be reconstructed using a single pass ISO surface extraction process when the rendering platform includes a GPGPU, or a histopyramid ISO surface extraction process when the rendering platform is implemented with legacy shaders.

At 1418, the deferred surface reconstruction engine generates a surface stream based on the geometry video stream and the selected surface reconstruction process. The deferred surface reconstruction engine executes the selected surface reconstruction process on the geometry stream to obtain a surface stream. A surface stream may include a geometry data stream and texture data stream of a surface of an object being reconstructed, where the object is depicted in the captured scene. The geometry data stream and the texture data stream may be a sequence of view-dependent geometry and texture snapshots, whereby each snapshot may be used to render a volumetric video content object at a given instance of time (e.g., a single frame or over multiple sequential frames) from a given viewpoint (e.g., taken from the point of view of the viewer observing the object). Thus, in embodiments, the deferred surface reconstruction engine may receive a viewing position parameter that indicates a virtual camera position of a viewer in relation to the virtual content object being rendered. Different surface reconstruction processes are described in greater detail with respect to FIGS. 16-19.

At 1420, the deferred surface reconstruction engine outputs the surface stream. In embodiments, the deferred surface reconstruction engine may output the surface stream (e.g., the geometry and texture data streams) as inputs to a host rendering platform, which generates a volumetric video content object based thereon. In embodiments, the host rendering platform may receive the geometry and texture data streams as inputs via one or more command buffers, such as command buffers dedicated to each of the geometry and texture data streams. The command buffers may connect to a shading and rasterization engine, which may process the geometry and texture data streams and send the output from the shading and rasterization process to a display environment for viewing of the volumetric content object characterized by the geometry and texture information by a user of a display device.

Figure 15:
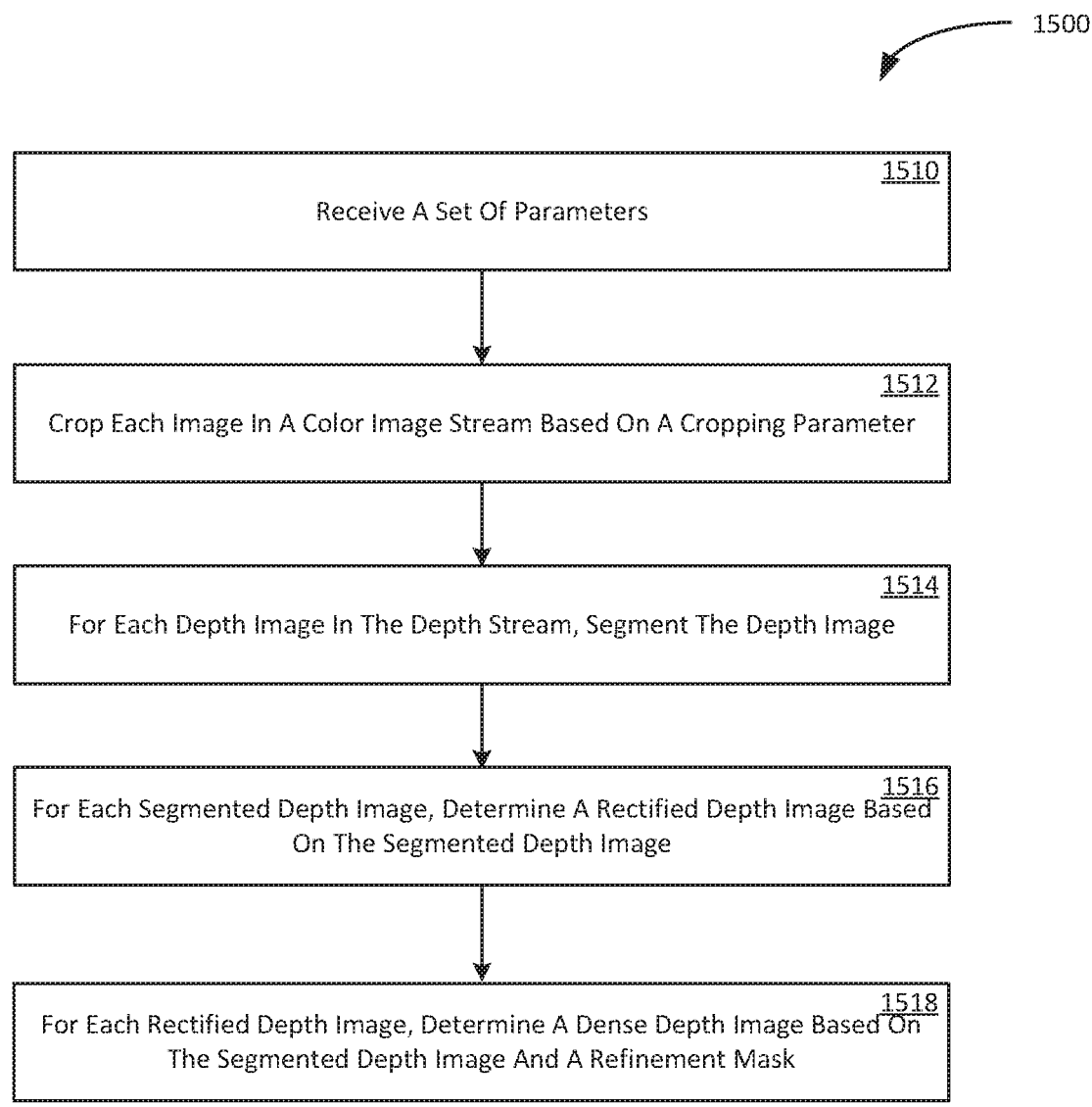
FIG. 15 is a flow chart illustrating a set of operations of a method for refining one or more color and depth streams, according to some implementations of the present disclosure.

FIG. 15 illustrates a set of operation of a method 1500 for generating a depth and color image stream. The method 1500 is describe as being performed by a refinement system (e.g., a refinement system 220 of FIG. 1 or 4). The method may be performed by any other suitable component without departing from the scope of the disclosure.

At 1510, the refinement system receives a set of parameters. The set of parameters may include calibration information and user defined parameters. The calibration information may include intrinsic calibration information relating to the depth sensor lens, intrinsic calibration information relating to the video camera lens, and extrinsic calibration information relating to a depth to color pose. The user defined parameters may be provided by a user of the system 100, and may include one or more refinement masks, a minimum and maximum depth value range, a color image cropping parameter, and one or more refinement parameters. In embodiments, a refinement mask is a binary image corresponding to an image of the video input, where white pixels represent user defined areas of interest. In embodiments, each refinement mask may be defined as a respective frame in the segmentation stream. In embodiments, the minimum and maximum depth value range that indicates the minimum depth and the maximum depth of the area being filmed with respect to a respective camera system. The color image crop may define a rectangular region of interest in the scene. The one or more refinement parameters may include color contribution, depth contribution, and/or filter scale. In some embodiments, the refinement system may further receive an automatic depth mask stream containing a stream of one or more depth masks.

At 1512, the refinement system crops each color image in the color image stream in based on the color image cropping parameter. The refinement system 220 may crop a color image in the color image stream using the cropping parameter to obtain a cropped image.

At 1514, the refinement system may segment each depth image in the depth image stream. In some embodiments, the refinement system may segment each depth image by pre-masking each respective depth image. In embodiments, the refinement system may pre-mask the depth image by applying the minimum and maximum depth values to the depth image, thereby removing any portions of the depth image that are outside the minimum and maximum depth values. Furthermore, in some embodiments, the refinement system may apply an automatic depth mask to each depth image. In embodiments, the result of the pre-masking is a segmented depth image.

At 1516, the refinement system 220 may, for each segmented depth image, determine a rectified depth image based on the segmented depth image. In embodiments, the refinement system may perform a perspective rectification process on each segmented depth image. In these embodiments, the refinement system may reproject each segmented depth image into a time aligned color image to obtain a rectified depth image. The refinement system may reproject a segmented depth image into a corresponding color image based on the calibration information corresponding to the camera system that captured the depth image and color image (e.g., the intrinsic calibration information relating to the depth sensor lens, intrinsic calibration information relating to the video camera lens, and extrinsic calibration information relating to a depth to color pose).

At 1518, the refinement system may, for each rectified depth image, determine a dense refined depth image based on the rectified depth image and a corresponding refinement mask. A dense refined depth image may refer to a depth image that is rectified to the color image and densely populated by pixels that are defined as of interested in the refinement mask. In embodiments, the refinement system may filter each rectified depth image using a filter that is guided by edge information within the color stream (e.g., where the edge of an object is detected) and the refinement mask to create a dense depth image. In some of these embodiments, the refinement system may segment each rectified depth image using a refinement mask that is defined by a time aligned segmentation frame of the corresponding segmentation stream to obtain the dense depth image. The refinement system may infer depth values of pixels in the dense depth image using neighboring depth values and/or may infer respective edge contribution of the pixels based on the edge contribution from the corresponding pixel in the color image. The refinement system may infer an optical flow signal from the color stream to conduct temporal denoising on the depth image. In embodiments, the refinement parameters determine the amount to which the color edges are respected and/or a size of the hole-filling kernel. In embodiments, the resultant dense refined depth image is the same or approximately resolution of the input color image.

At 1520, the refinement system may generate and output a depth and color image stream based on the cropped color images and the dense depth refined images. The refinement system may combine each cropped image with a time aligned dense refined depth image, whereby the depth and color image stream is a sequence of cropped images and time-aligned dense defined depth images.

Figure 16:
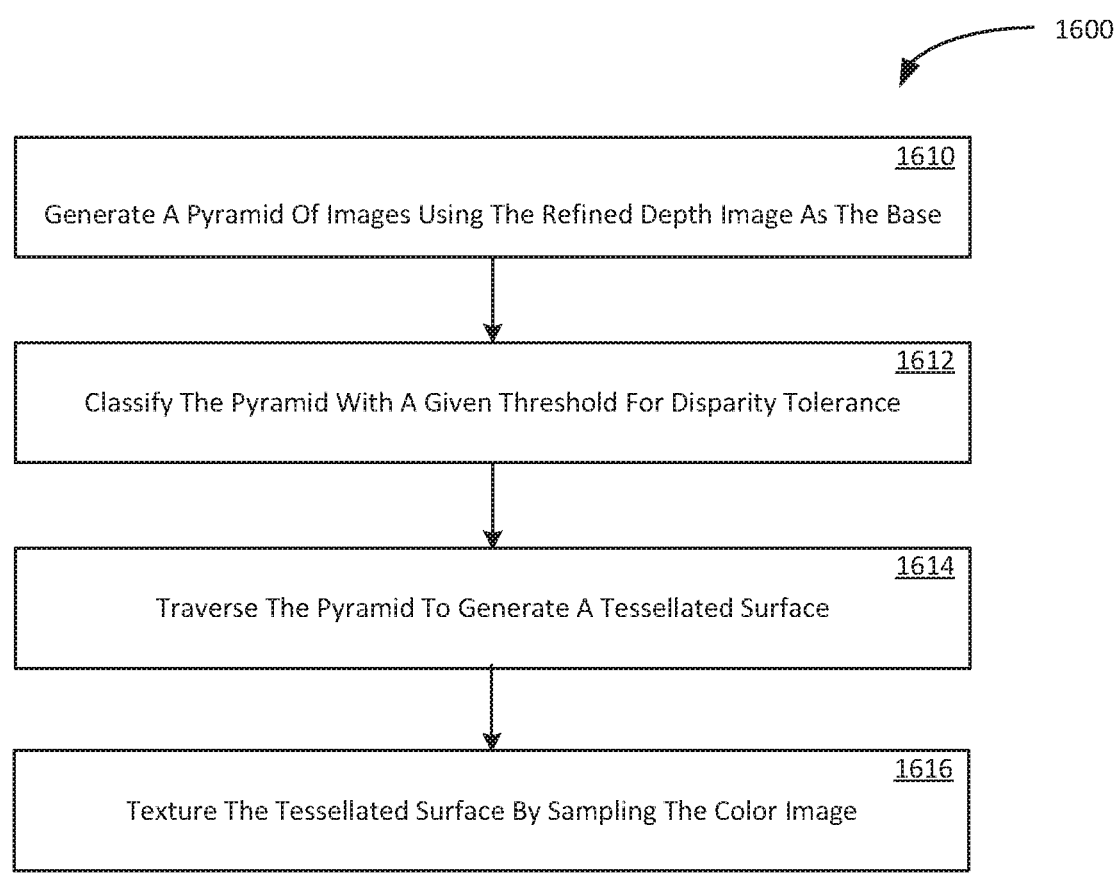
FIG. 16 is a flow chart illustrating a set of operations of a method for reconstructing a surface using a tessellated grid process, according to some implementations of the present disclosure.

FIG. 16 illustrates an example set of operations of a method 1600 for performing surface reconstruction given a geometry via a quad-tree tessellation process. A quad-tree tessellation process may be performed when a scene is captured from a single perspective and a GPGPU is available to render the reconstructed surface. In some of these embodiments, the deferred surface reconstruction engine 130 may take advantage of the compute append buffer of the GPU to produce an adaptive mesh that tessellates densely on high disparity internal and external edges.

At 1610, the deferred surface reconstruction engine may generate a pyramid of images for each geometry frame of a geometry stream, whereby the base of each pyramid is the dense refined depth image embedded in the geometry frame. At 1612, the deferred surface reconstruction engine may classify the pyramid with a given threshold for disparity tolerance. In embodiments, the deferred surface reconstruction engine may perform a Quadtree Pyramid Classification to generate and classify the pyramid. For example, the deferred surface reconstruction engine may, for each level of the pyramid, classify each pixel of the pyramid level by assigning the summation of the absolute value of the difference between the four pixels in underlying dense pyramid step. At 1614, the deferred surface reconstruction engine may traverse the classified pyramid to generate a tessellated surface. In embodiments, the deferred surface reconstruction engine may traverse each level of the classified pyramid and may output geometry in the instance that the underlying disparity is under a certain threshold, indicating a flat region of the depth image. In some embodiments, the deferred surface reconstruction engine may perform a Quadtree Pyramid Traversal on each pyramid to traverse the pyramid and generate the tessellated surface. At 1616, the deferred surface reconstruction engine may texture the tessellated surface by sampling the color image. In these embodiments, the deferred surface reconstruction engine may perform edge refinement and projective texturing on the tessellated geometry using the color image to generate the texture of the object for a given geometry frame. In this approach, the deferred surface reconstruction engine may reclassify each independent geometry frame of the geometry video stream, such that a new tessellation and corresponding texture are generated and output to the host rendering platform for the duration of the geometry frame.

Figure 17:
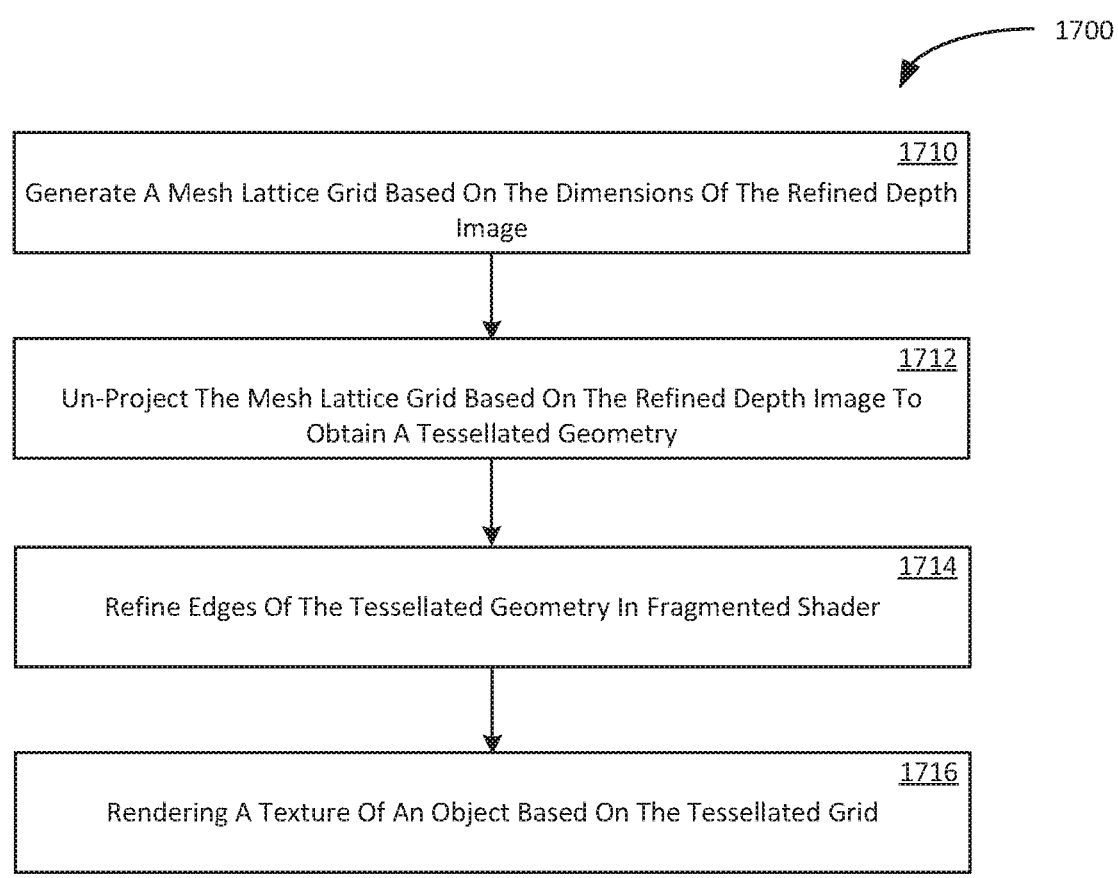
FIG. 17 is a flow chart illustrating a set of operations of a method for reconstructing a surface using a mesh lattice un-projection process, according to some implementations of the present disclosure.

FIG. 17 illustrates an example set of operations of a method 1700 for performing surface reconstruction given a geometry via a mesh lattice un-projection process. A mesh lattice un-projection process may be performed when a scene is captured from a single perspective and a GPGPU is not available to render the reconstructed surface. In these scenarios, the surface reconstruction may be performed using legacy shaders.

At 1710, the deferred surface reconstruction engine may, for each geometry frame, generate a mesh lattice grid based on the dimensions of depth image embedded in the geometry frame. In embodiments, the surface reconstruction engine may generate a densely tessellated grid geometry buffer, whereby the surface reconstruction engine generates one vertex for each pixel of the depth image stream. In some of these embodiments, the grid may be reduced by a factor of 2, 4, or 8 pixels per vertex to reduce rendering overhead. At 1712, the deferred surface reconstruction engine unprojects the mesh lattice grid based on the refined depth image to obtain a tessellated geometry. In these embodiments, the deferred surface reconstruction engine may, in a vertex shader, perspective unproject (e.g., 2D to 3D) the vertices into a space that is contained within the depth image along the frustum of the depth sensor based on the lens intrinsics of the depth sensor. At 1714, the deferred surface reconstruction engine may refine the edges of the tessellate grid in a fragmented shader. In these embodiments, the deferred surface reconstruction engine may employ an edge preserving method to maintain visual fidelity. In some of these embodiments, the deferred surface reconstruction engine may utilize samplings of neighbor pixels to move vertices off of the edge of the depth to match neighboring depth samples, such that edges are preserved in the fragment shader. In the fragment shader, the deferred surface reconstruction engine 130 may discard the fragments that fall on steep edges or are at the origin point of the depth camera perspective. At 1716, the deferred surface reconstruction engine renders a texture of an object depicted in the scene based on the tessellated grid. In embodiments, the deferred surface reconstruction engine may render the texture with a geometry buffer bound. The deferred surface reconstruction engine may then texture the remaining geometry with the corresponding pixels in the color image.

Figure 18:
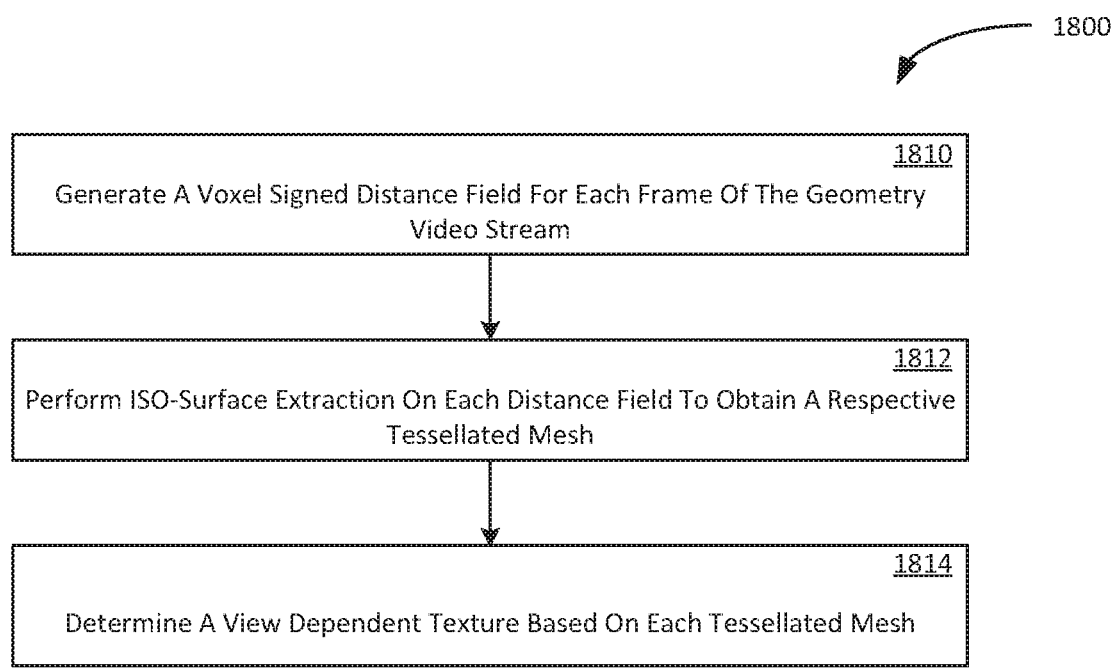
FIG. 18 is a flow chart illustrating a set of operations of a method for reconstructing a surface using an ISO surface extraction process, according to some implementations of the present disclosure.

FIG. 18 illustrates an example set of operations of a method 1800 for performing surface reconstruction given a geometry via a single-pass ISO surface extraction process. A single-pass ISO surface extraction process may be performed when a scene is captured from multiple perspectives and a GPGPU is available to render the reconstructed surface.

At 1810, the deferred surface reconstruction engine generates a signed voxel distance field for each geometry image frame in the geometry stream. In these embodiments, the deferred surface reconstruction engine may generate a voxel signed distance field for each geometry frame of geometry video stream. As discussed, a voxel signed distance field may be a three-dimensional grid of voxels, where each voxel contains a signed value representing a distance from the voxel to the implicit surface described in the corresponding geometry frame. In embodiments, the deferred surface reconstruction engine may determine a voxel signed distance field classification for each voxel, in each distance field. In some embodiments, the deferred surface reconstruction engine may project, for each voxel in a distance field, a point representing the voxel into each depth image depicted in a respective geometry frame using the global extrinsic calibration and the depth camera lens intrinsics of each respective depth camera. The deferred surface reconstruction engine may then register, for each voxel, whether the point representing the voxel is behind the surface (contained), in front of the surface (outside), or has no data (undetermined). The deferred surface reconstruction engine may then, for each voxel that is registered as within or in front of the surface, determine an average distance to the surface to obtain the classification. If the voxel is outside the surface, the average distance from the voxel may be assigned a positive sign. If the voxel is in front of the surface, the average distance from the voxel may be assigned a negative sign. The deferred surface reconstruction engine may perform the foregoing for each geometry frame of the geometry video stream.

At 1812, the deferred surface reconstruction engine performs ISO-surface extraction on each signed voxel distance field to obtain respective tessellated meshes. Once the distance field classifications have been determined for a distance field, the deferred surface reconstruction engine may perform an ISO-surface extraction technique, such as Marching Cubes (e.g., via Indirect Drawing), in conjunction with the tessellated Append Compute Buffers of the GPU to extract a tessellated mesh (an explicit surface) from the signed distance field.

At 1814, the deferred surface reconstruction engine determines a view dependent texture for each tessellated mesh. Once a tessellated mesh has been extracted, the deferred surface reconstruction engine may generate a view dependent projective texturing corresponding to the tessellated mesh. In some of these embodiments, the deferred surface reconstruction engine may compute, for the geometry frame corresponding to the tessellated mesh, a texture for the surface extracted in connection with the geometry frame. In these embodiments, each fragment of the surface may be projected into the color texture of each perspective. In embodiments, the deferred surface reconstruction engine may receive a viewing position parameter that indicates a virtual camera position of a viewer in relation to the virtual content object being rendered. Thus, in embodiments, the deferred surface reconstruction engine may calculate a weighted average of the texture, where the weight may be calculated based on the dot product between the view position parameter, the source camera's perspective, and a normal vector of the extracted surface. In embodiments, the weighting may favor texture samples from source cameras that are relatively more parallel to the perspective of the view position, which may optimize on-axis textures. In some embodiments, the deferred surface reconstruction engine may eliminate texture contributions from a source camera system, if the geometry extracted from the output of the source camera is occluded from the field of view of the viewing position and/or back-facing angles are detected with respect to the viewing position. Upon determining the view-dependent texture corresponding to a geometry frame, the deferred surface reconstruction engine may output the tessellated mesh and corresponding view-dependent texture, such that the outputted pair is a portion of the surface stream.

Figure 19:
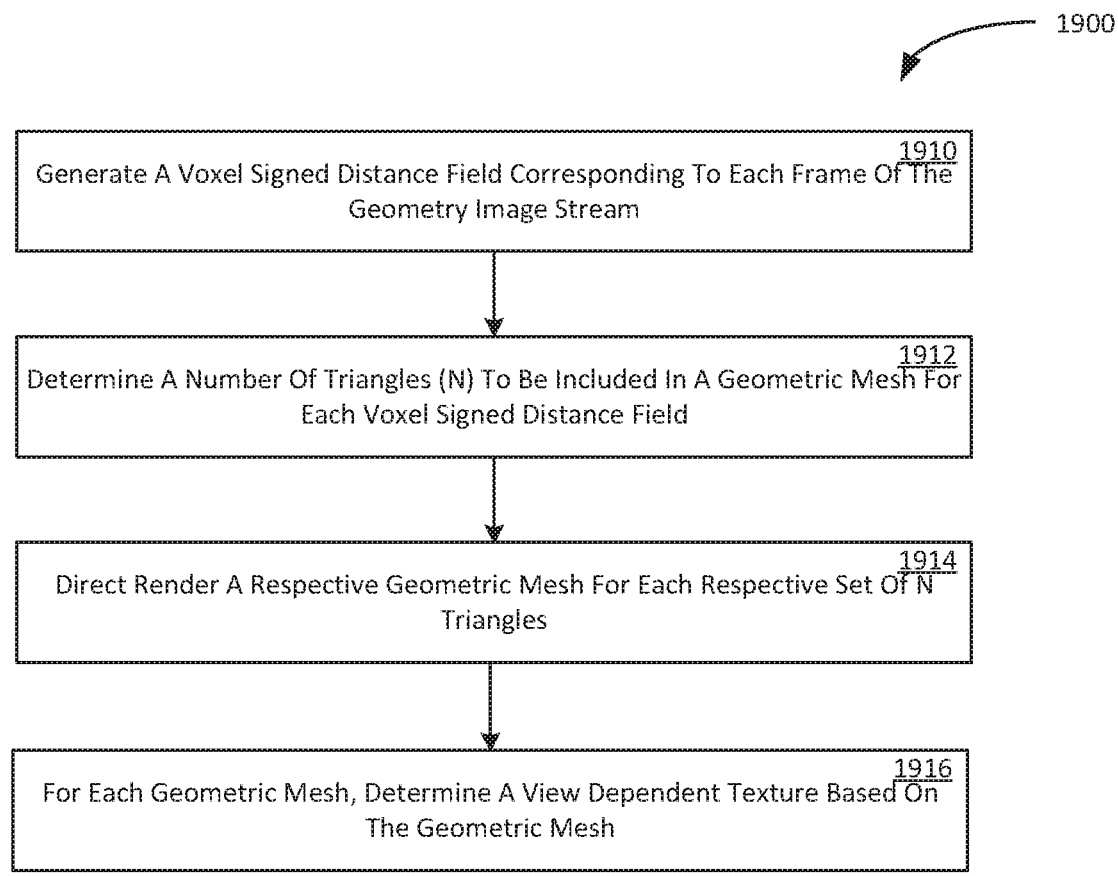
FIG. 19 is a flow chart illustrating a set of operations of a method for reconstructing a surface using a histopyramid surface extraction, according to some implementations of the present disclosure.

FIG. 19 illustrates an example set of operations of a method 1900 for performing surface reconstruction given a geometry via a single-pass ISO surface extraction process. A single-pass ISO surface extraction process may be performed when a scene is captured from multiple perspectives and a GPGPU is not available to render the reconstructed surface.

At 1910, the deferred surface reconstruction engine generates a signed voxel distance field for each frame in the geometry stream. In these embodiments, the deferred surface reconstruction engine may generate a voxel signed distance field for each geometry frame of geometry video stream. As discussed, a voxel signed distance field may be a three-dimensional grid of voxels, where each voxel contains a signed value representing a distance from the voxel to the implicit surface described in the corresponding geometry frame. In embodiments, the deferred surface reconstruction engine may determine a voxel signed distance field classification for each voxel, in each distance field. In some embodiments, the deferred surface reconstruction engine may project, for each voxel in a distance field, a point representing the voxel into each depth image depicted in a respective geometry frame using the global extrinsic calibration and the depth camera lens intrinsics of each respective depth camera. The deferred surface reconstruction engine may then register, for each voxel, whether the point representing the voxel is behind the surface (contained), in front of the surface (outside), or has no data (undetermined). The deferred surface reconstruction engine may then, for each voxel that is registered as within or in front of the surface, determine an average distance to the surface to obtain the classification. If the voxel is outside the surface, the average distance from the voxel may be assigned a positive sign. If the voxel is in front of the surface, the average distance from the voxel may be assigned a negative sign. The deferred surface reconstruction engine may perform the foregoing for each geometry frame of the geometry video stream.

At 1912, the deferred surface reconstruction engine determines a number of triangles (N) to be included in a geometric mesh based on each signed voxel distance field. Once the distance field classifications have been determined for a set of time aligned frames of the multiple perspective fields, the deferred surface reconstruction engine may use, for example, a histo-pyramid classification schema to determine the number of triangles (i.e., N) that will be in the geometry mesh.

At 1914, the deterred surface reconstruction engine indirect renders a respective geometric mesh for each respective set of N triangles. In embodiments, the deferred surface reconstruction engine may render a respective geometric mesh using direct rendering with the number of triangles contained in a pyramid base, where the pyramid base is generated based on the voxel signed distance field. In embodiments, each level of the histopyramid contains the number of triangles for the related denser pyramid level. In these embodiments, the smallest pyramid level contains a single value that totals the number of triangles in the surface. A direct draw call can then be used with this value to execute an ISO surface extraction where each triangle has a known position within an output buffer based on its histopyramid index.

At 1916, the deferred surface reconstruction engine determines a view dependent texture for each geometric mesh. In embodiments, once the surface (e.g., geometric mesh) has been extracted, the deferred surface reconstruction engine may generate a view dependent projective texturing. In some of these embodiments, the deferred surface reconstruction engine may compute, for each frame of the set of time aligned frames, a texture for the surface extracted in connection with the time-aligned frame. In these embodiments, each fragment of the surface may be projected into the color texture of each perspective. The deferred surface reconstruction engine may calculate a weighted average of each texture, where the weight may be calculated based on the dot product between the view position (e.g., the viewing position parameter), the source camera's perspective, and a normal vector of the extracted surface. In embodiments, the weighting may favor texture samples from source cameras that are relatively more parallel to the perspective of the view position, which may optimize on-axis textures. In some embodiments, the deferred surface reconstruction engine may eliminate texture contributions from a source camera system, if the geometry extracted from the output of the source camera is occluded from the field of view of the viewing position and/or back-facing angles are detected with respect to the viewing position.

It is noted that in some embodiments, view-dependent texturing occurs at the rate of refresh of the host rendering platform, and not at the rate of playback of the geometry video. For example, a surface being depicted in a virtual reality environment may render at, for example, 90 Hz, while the geometry video may only be updating at, for example, 24 Hz. For each frame rendered by the host platform, the surface texturing may be updated, while the geometry only may update upon an update from the geometry video stream.

Detailed embodiments of the present disclosure are disclosed herein; however, it is to be understood that the disclosed embodiments are merely exemplary of the disclosure, which may be embodied in various forms. Therefore, specific structural and functional details disclosed herein are not to be interpreted as limiting, but merely as a basis for the claims and as a representative basis for teaching one skilled in the art to variously employ the present disclosure in virtually any appropriately detailed structure. The terms "a" or "an," as used herein, are defined as one or more than one. The term "another," as used herein, is defined as at least a second or more. The terms "including" and/or "having," as used herein, are defined as comprising (i.e., open transition).

While only a few embodiments of the present disclosure have been shown and described, it will be obvious to those skilled in the art that many changes and modifications may be made thereunto without departing from the spirit and scope of the present disclosure as described in the following claims. All patent applications and patents, both foreign and domestic, and all other publications referenced herein are incorporated herein in their entireties to the full extent permitted by law.

The methods and systems described herein may be deployed in part or in whole through a machine that executes computer software, program codes, and/or instructions on a processor. The present disclosure may be implemented as a method on the machine, as a system or apparatus as part of or in relation to the machine, or as a computer program product embodied in a computer readable medium executing on one or more of the machines. In embodiments, the processor may be part of a server, cloud server, client, network infrastructure, mobile computing platform, stationary computing platform, or other computing platforms. A processor may be any kind of computational or processing device capable of executing program instructions, codes, binary instructions, and the like. The processor may be or may include a signal processor, digital processor, embedded processor, microprocessor, or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor, or any machine utilizing one, may include non-transitory memory that stores methods, codes, instructions, and programs as described herein and elsewhere. The processor may access a non-transitory storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache, and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server, cloud server, and other variants such as secondary server, host server, distributed server, and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, social networks, and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client, and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers, and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM, and the like. The processes, methods, program codes, instructions described herein and elsewhere may be executed by one or more of the network infrastructural elements. The methods and systems described herein may be adapted for use with any kind of private, community, or hybrid cloud computing network or cloud computing environment, including those which involve features of software as a service (SaaS), platform as a service (PaaS), and/or infrastructure as a service (IaaS).

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, program codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or intangible items from one state to another. The methods and systems described herein may also transform data representing physical and/or intangible items from one state to another.

The elements described and depicted herein, including in flowcharts and block diagrams throughout the Figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers, and the like. Furthermore, the elements depicted in the flowchart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps associated therewith, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable devices, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, methods described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the disclosure has been disclosed in connection with the preferred embodiments shown and described in detail, various modifications and improvements thereon will become readily apparent to those skilled in the art. Accordingly, the spirit and scope of the present disclosure is not to be limited by the foregoing examples but is to be understood in the broadest sense allowable by law.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitations of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

While the foregoing written description enables one skilled in the art to make and use what is considered presently to be the best mode thereof, those skilled in the art will understand and appreciate the existence of variations, combinations, and equivalents of the specific embodiments, methods, and examples herein. The disclosure should therefore not be limited by the above described embodiment, method, and examples, but by all embodiments and methods within the scope and spirit of the disclosure.

Any element in a claim that does not explicitly state "means for" performing a specified function, or "step for" performing a specified function, is not to be interpreted as a "means" or "step" clause as specified in 35 U.S.C. § 112(f). In particular, any use of "step of" in the claims is not intended to invoke the provision of 35 U.S.C. § 112(f).

Persons skilled in the art in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A method for producing a synthetic video image comprising:
   receiving one or more video and depth inputs from one or more respective camera systems capturing a scene one or more respective perspectives, wherein each video and depth input is captured by a respective camera system and includes a respective video stream of the scene captured from a respective perspective and a respective depth stream of the scene captured from the respective perspective;
   for each respective video and depth input, generating a depth and color stream corresponding to the respective perspective of the video and depth input based on the video stream and the depth stream, wherein each respective depth and color stream includes i) a color image stream including a sequence of color images derived from the video stream of the video and depth input and ii) a refined depth image stream corresponding to the color image stream that includes a sequence of dense refined depth images that are refined by reprojecting depth images from the depth stream into respective color images of the video stream, wherein each dense refined depth image includes a grid of depth pixels that each indicate a respective depth value and respective color values derived from a corresponding color image;

generating a geometry video stream corresponding to the scene based on one or more depth and color streams respectively derived from the one or more color and depth input, wherein the geometry video stream includes a sequence of geometry frames, each geometry frame having embedded therein, a respective color image and a respective dense refined depth image from each of the one or more depth and color streams;

selecting a surface reconstruction process to process the geometry video stream from a plurality of surface reconstruction processes based on a number of perspectives from which the scene is captured and whether a specific hardware capability is available to process the geometry video stream;

generating a surface stream based on the geometry video stream in accordance with the selected surface reconstruction process, wherein the surface stream includes a geometry stream that defines a geometry of an object captured in the scene, and a texture stream that is time aligned with the geometry stream that defines a texture of a surface of the object; and outputting the surface stream to a buffer and/or a renderer.

2. The method of claim 1, wherein the plurality of surface reconstruction processes include two or more of: a tessellation process, a vertex and surface reconstruction process, a single pass ISO surface extraction, and a histopyramid surface extraction.

3. The method of claim 2, wherein the tessellation process is the selected surface reconstruction process when the scene is captured from a single perspective and a general process graphics processor unit (GPGPU) is available process the surface stream.

4. The method of claim 3, wherein generating the surface stream in accordance with the tessellation process includes:
generating a pyramid of images based on a dense refined depth image of the depth stream;
traversing the pyramid to assign values to each tile of the pyramid based on a total amount of depth disparity contained within each respective tile underneath the tile to obtain a tessellated geometry;
texturing the tessellated geometry to obtain the texture of the tessellated geometry.

5. The method of claim 2, wherein the vertex and surface reconstruction process is the selected surface reconstruction process when the scene is captured from a single perspective and a GPGPU is not available to process the surface stream.

6. The method of claim 5, wherein generating the surface stream in accordance with the vertex and surface reconstruction process includes:
generating a tessellated grid based on a dense refined depth image of the depth image stream, where each vertex in the tessellated grid represents a respective depth pixel; and
rendering a texture corresponding to an object in the refined depth image based on the tessellated grid by perspective unprojecting each vertex in the tessellated grid into a space that is contained within the refined depth image along a frustum of a depth camera that captured the depth input.

7. The method of claim 2, wherein the single pass ISO surface extraction is the selected surface reconstruction process when the scene is captured from multiple perspectives and a general process graphics processor unit (GPGPU) is available process the surface stream.

8. The method of claim 7, wherein generating the surface stream in accordance with the single pass ISO surface extraction process includes:
for each geometry frame of the geometry stream:
generating a voxel signed distance field based on each refined depth image embedded in the geometry frame, wherein the voxel signed distance field is a three-dimensional grid of voxels and each voxel indicates a signed distance from the voxel to an implicit surface defined in the geometry frame; and
performing an ISO-surface extraction on the voxel signed distance field to extract a tessellated mesh describing a geometry of the object; and
determining a view-dependent texture based on the tessellated mesh and a viewing position parameter that indicates a point of view relative to the scene from which the object will be observed.

9. The method of claim 8, wherein generating the voxel signed distance field includes:
generating a voxel distance field based on each refined depth image corresponding to the frame, wherein the voxel distance field is a three-dimensional grid of voxels and each voxel indicates an average distance from the voxel to the implicit surface;
signing at least a subset of voxels in the voxel distance field based on a respective classification of each voxel in the subset of voxels by:
projecting a point representing the voxel into the geometry frame based on a global extrinsic calibration and a depth camera lens intrinsic calibration corresponding to the dense refined depth image;
determining whether the point is behind a surface of the object depicted in the scene or in front of the surface;
when the voxel is behind the surface, assigning a first sign to the average distance in the voxel; and
when the voxel is in front of the surface, assigning a second sign that is opposite to the first sign to the average distance indicated in the voxel.

10. The method of claim 8, wherein determining a view-dependent texture includes:
receiving the viewing position parameter from the renderer;
projecting each fragment of the tessellated mesh into a color texture of the object derived from the color image streams corresponding to the tessellated mesh; and
calculating a weighted average of each fragment based on the viewing position parameter, the perspective of the corresponding camera system, and a normal vector of the tessellated mesh.

11. The method of claim 2, wherein the histopyramid ISO-surface extraction process is the selected surface reconstruction process when the scene is captured from multiple perspectives and GPGPU capabilities are not available to process the surface stream.

12. The method of claim 11, wherein generating the surface stream in accordance with the histopyramid ISO-surface extraction process includes:
for each geometry frame in the geometry video stream:
generating a voxel signed distance field based on each refined depth image embedded in the geometry frame, wherein the voxel signed distance field is a three-dimensional grid of voxels and each voxel indicates a signed distance from the voxel to an implicit surface defined in the geometry frame; and determining a number (N) of triangles to be included in a geometric mesh that describes a surface of the object based on a histo-pyramid classification of the voxel signed distance field;

direct rendering the N triangles to obtain the geometric mesh; and determining a view-dependent texture based on the geometric mesh and a viewing position parameter that indicates a point of view relative to the scene from which the object will be observed.

13. The method of 12, wherein generating the voxel signed distance field includes:

generating a voxel distance field based on each refined depth image corresponding to the frame, wherein the voxel distance field is a three-dimensional grid of voxels and each voxel indicates an average distance from the voxel to the implicit surface;

signing at least a subset of voxels in the voxel distance field based on a respective classification of each voxel in the subset of voxels by:

projecting a point representing the voxel into the geometry frame based on a global extrinsic calibration and a depth camera lens intrinsic calibration corresponding to the dense refined depth image;

determining whether the point is behind a surface of the object depicted in the scene or in front of the surface;

when the voxel is behind the surface, assigning a first sign to the average distance in the voxel; and when the voxel is in front of the surface, assigning a second sign that is opposite to the first sign to the average distance indicated in the voxel.

14. The method of claim 1, wherein generating a depth and color stream corresponding to the respective perspective of the video and depth input includes:

receiving user defined parameters, including a refinement mask, a minimum depth value, a maximum depth value, and a color image crop parameter;

cropping each color image in the video stream based on the color image crop parameter to obtain the color image stream;

for each depth image in the depth stream:

determining a segmented depth image by segmenting the depth image based on the minimum depth value and maximum depth value;

determining a rectified depth image by reprojecting the segmented depth image into a corresponding cropped color image based on an intrinsic lens calibration of a video camera of the camera system, an intrinsic lens calibration of a depth camera of the camera system, and an extrinsic calibration between the video camera and depth camera; and determining a dense depth image by filtering the rectified depth image based on a detected edge of the object and the refinement mask.

15. The method of claim 14, wherein determining the segmented depth image includes applying an automatic depth mask to each depth image in the depth stream, wherein the automatic depth mask is received in the user defined parameters.

16. The method of claim 14, wherein the refinement mask is defined in a segmentation stream output by the video and depth input.

17. The method of claim 1, wherein the renderer generates a volumetric video content object based on the surface stream for inclusion in a three-dimensional rendering.

18. The method of claim 1, wherein each camera system includes i) a video camera that captures and outputs the respective video stream of the scene taken from the respective perspective of the camera system, and ii) at least one depth sensor that captures and outputs the respective depth stream of the scene taken from the respective perspective.

19. The method of claim 1, wherein the color images in the color image stream of each respective depth and color stream are cropped images that are cropped during the refinement process.

20. The method of claim 1, wherein outputting the surface stream includes writing the surface stream to one or more command buffers of the renderer.

21. The method of claim 1, wherein the selected surface reconstruction process is executed in a runtime environment of the renderer.

* * * * *